United States Patent

[11] 3,525,368

| [72] | Inventor | Jonathan J. Sirota<br>Brookline, Massachusetts |
|---|---|---|
| [21] | Appl. No. | 502,249 |
| [22] | Filed | Oct. 22, 1965 |
| [45] | Patented | Aug. 25, 1970 |
| [73] | Assignee | By mesne assignments, to<br>Memory Technology Inc.<br>a corporation of Massachusetts |

[54] METHOD AND APPARATUS FOR WEAVING MEMORY BRAIDS
6 Claims, 17 Drawing Figs.

[52] U.S. Cl. ..................................................... 139/55,
139/317
[51] Int. Cl. ........................................................ D03c 19/00
[50] Field of Search ........................................... 139/55,
317, 1, 319; 340/172.5 (Cursory); 235/61.9
(Cursory), 61.10 (Cursory)

[56] References Cited
UNITED STATES PATENTS

| 1,728,438 | 9/1929 | Nakanishi .................... | 139/317 |
| 2,136,076 | 11/1938 | Fisher et al. .................. | 139/55 |
| 2,204,891 | 6/1940 | Hamilton ...................... | 139/55 |
| 2,714,901 | 8/1955 | Casper ......................... | 139/319 |
| 3,117,598 | 1/1964 | Burkhalter .................... | 139/319 |

*Primary Examiner*—Henry S. Jaudon
*Attorneys*—McLean, Marton & Boustead, E. L. Bernard, M. J. Brown, H. W. Foulds, Jr., J. W. Routh, N. D. Sayre, M. L. Sutherland & C. von Boetticher, Jr.

ABSTRACT: Apparatus and method for justifying type composition including a syllabification memory, and a woven read-only memory and an apparatus and method of forming such woven memory. A proposed line is sensed, and character widths are noted. When a last word oversets a line, it is determined whether the line can be justified by space-band expansion. A hyphenation memory contains syllabification information including root words representing a vocabulary and comprises magnetic cores threaded by wires representing words. Woven memory braids are formed by reading paper tape to control the positions of heddles on a loom.

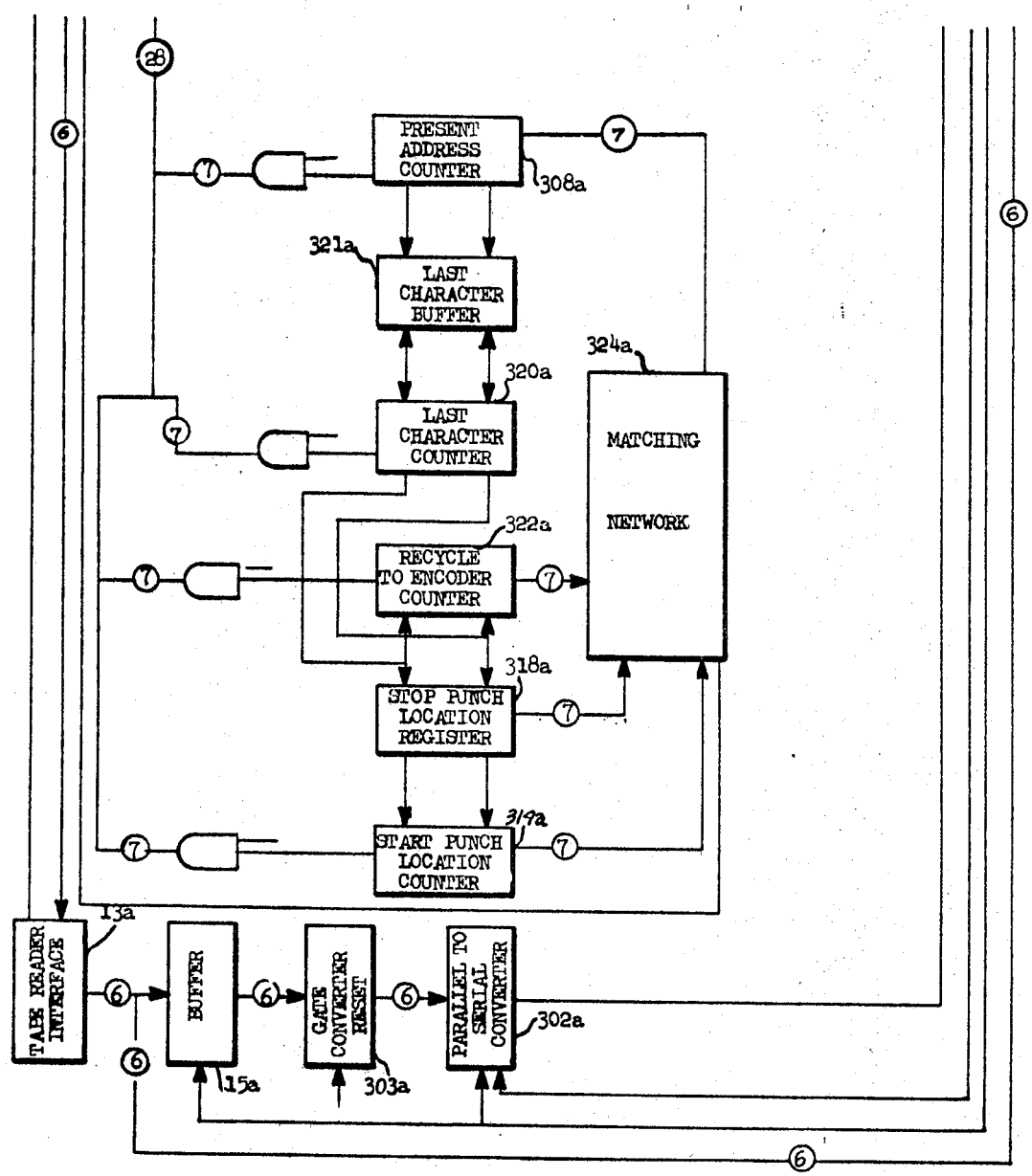
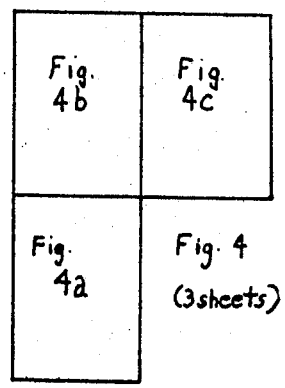
FIG. 4a
INVENTOR
Jonathan Jay Sirota

Patented Aug. 25, 1970

INVENTOR

Jonathan Jay Sirota

BY
Jack Lauren
ATTORNEY

Patented Aug. 25, 1970
3,525,368
Sheet 9 of 12
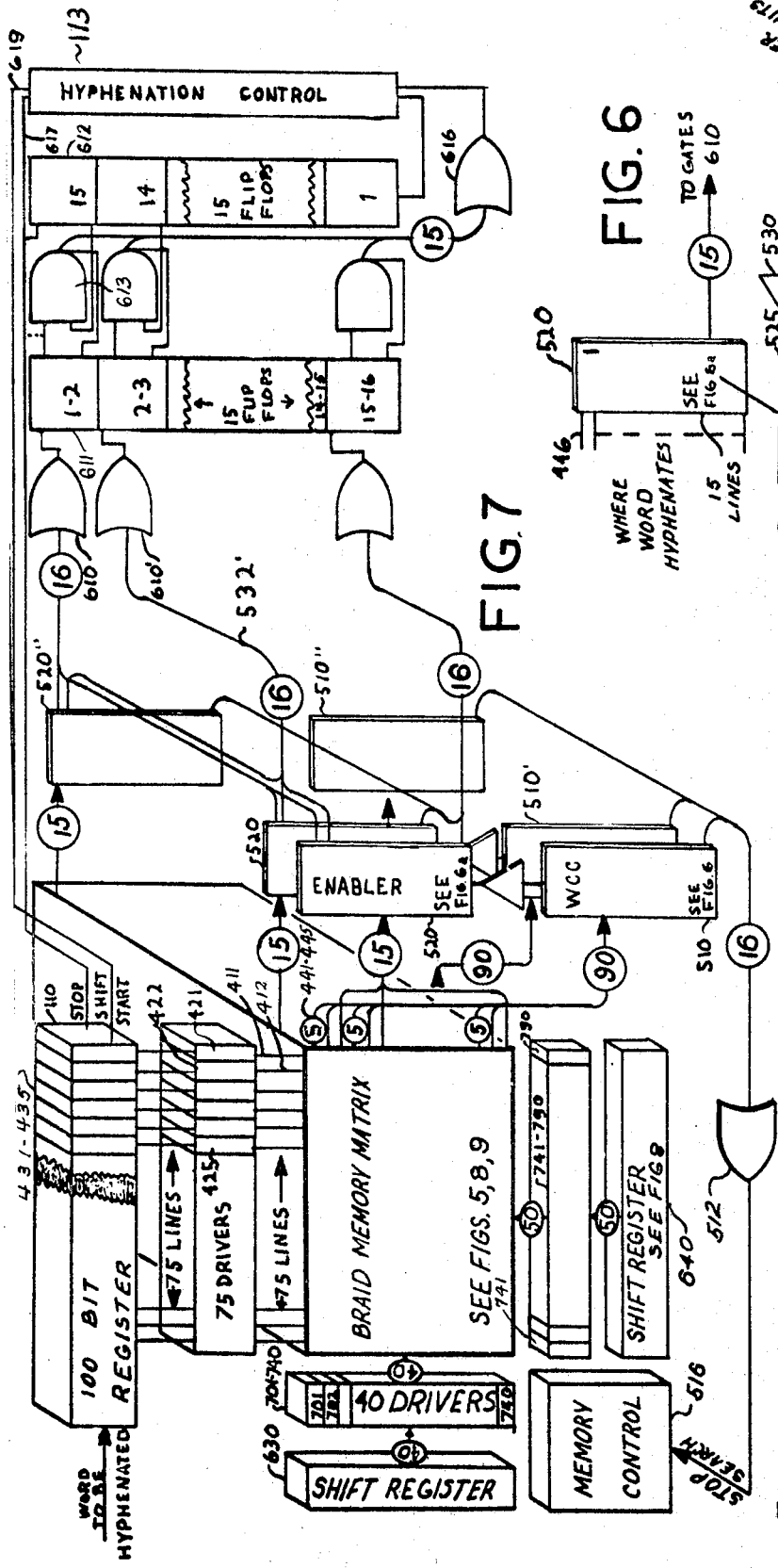
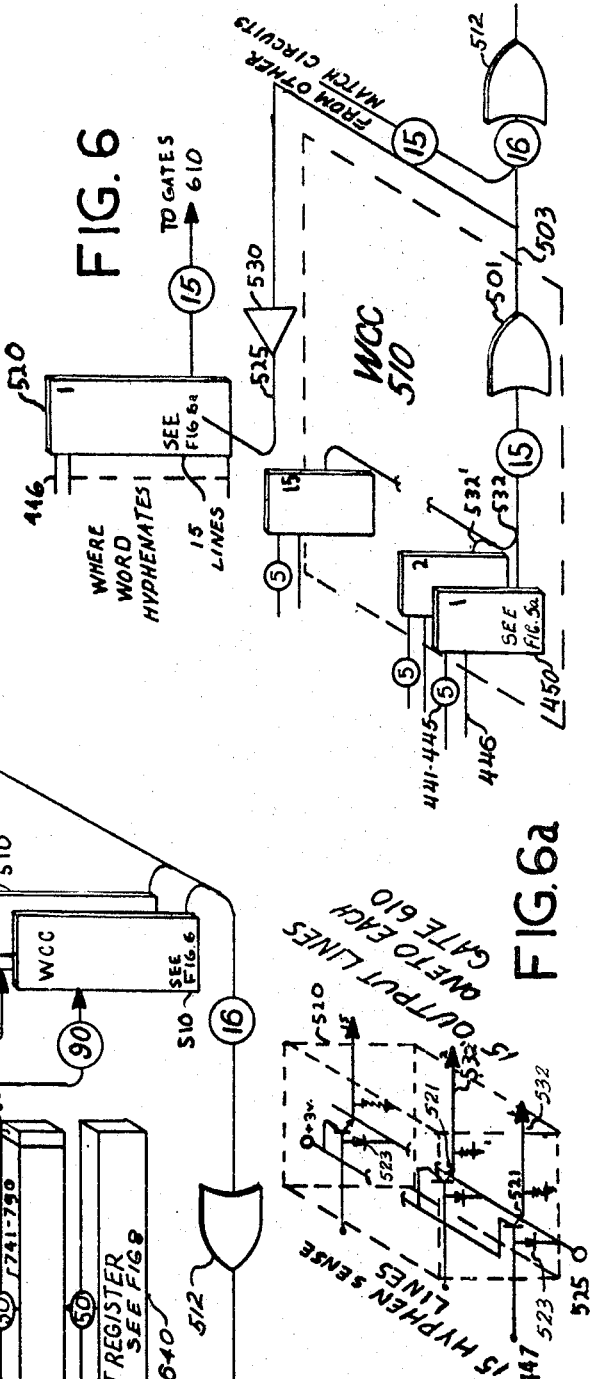
INVENTOR
Jonathan Jay Sirota
BY
Jack Larsen
ATTORNEY

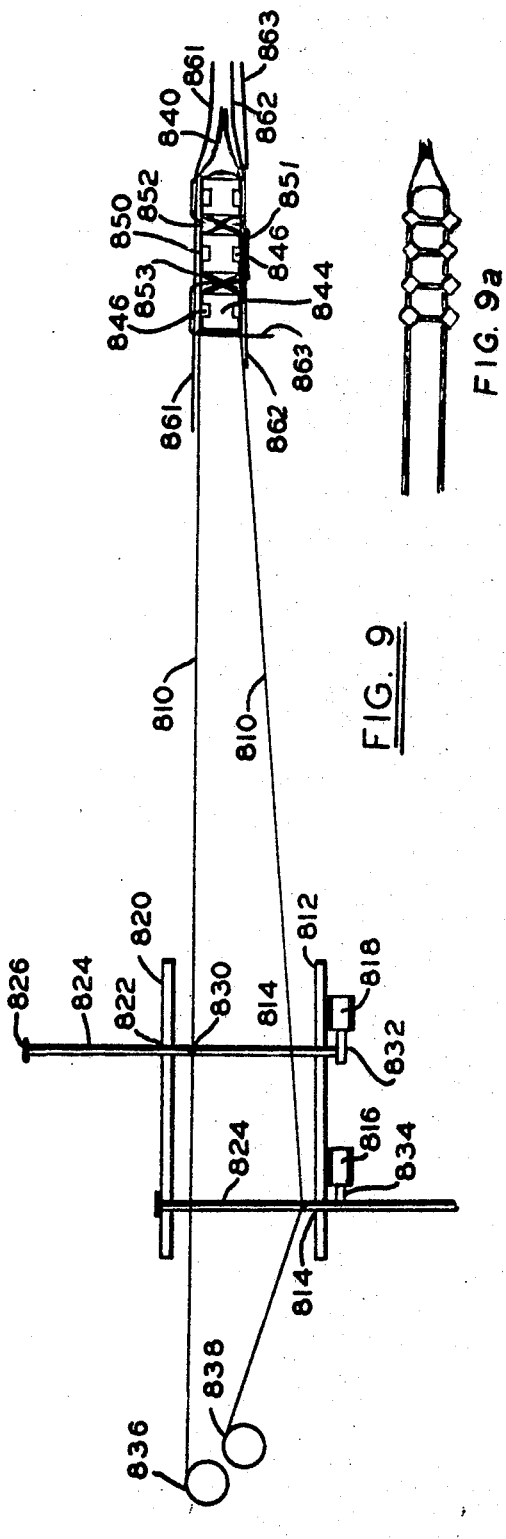
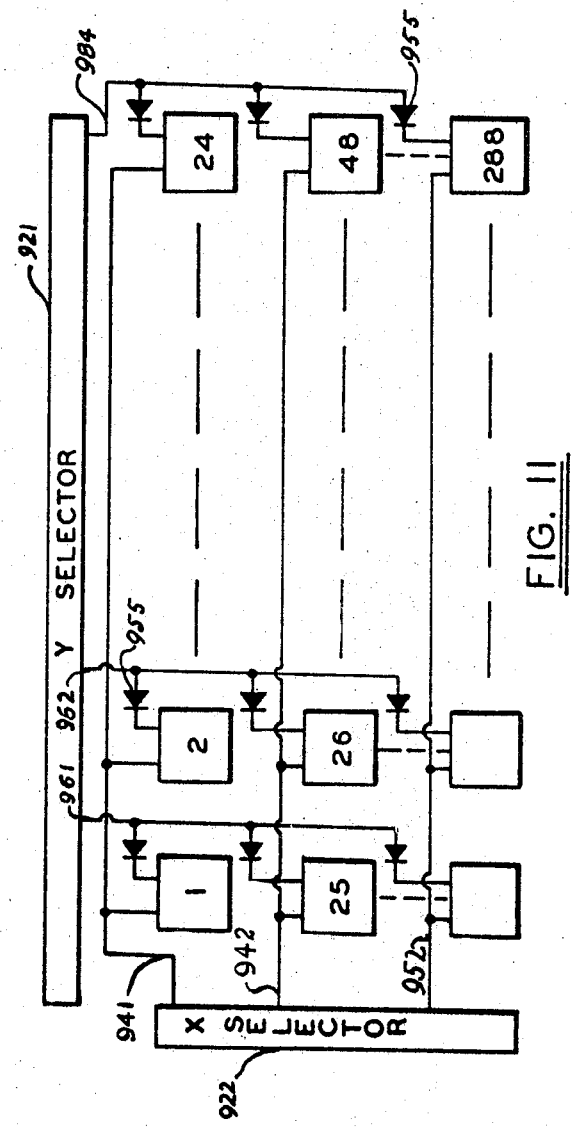
INVENTOR.
Jonathan Jay Sirota

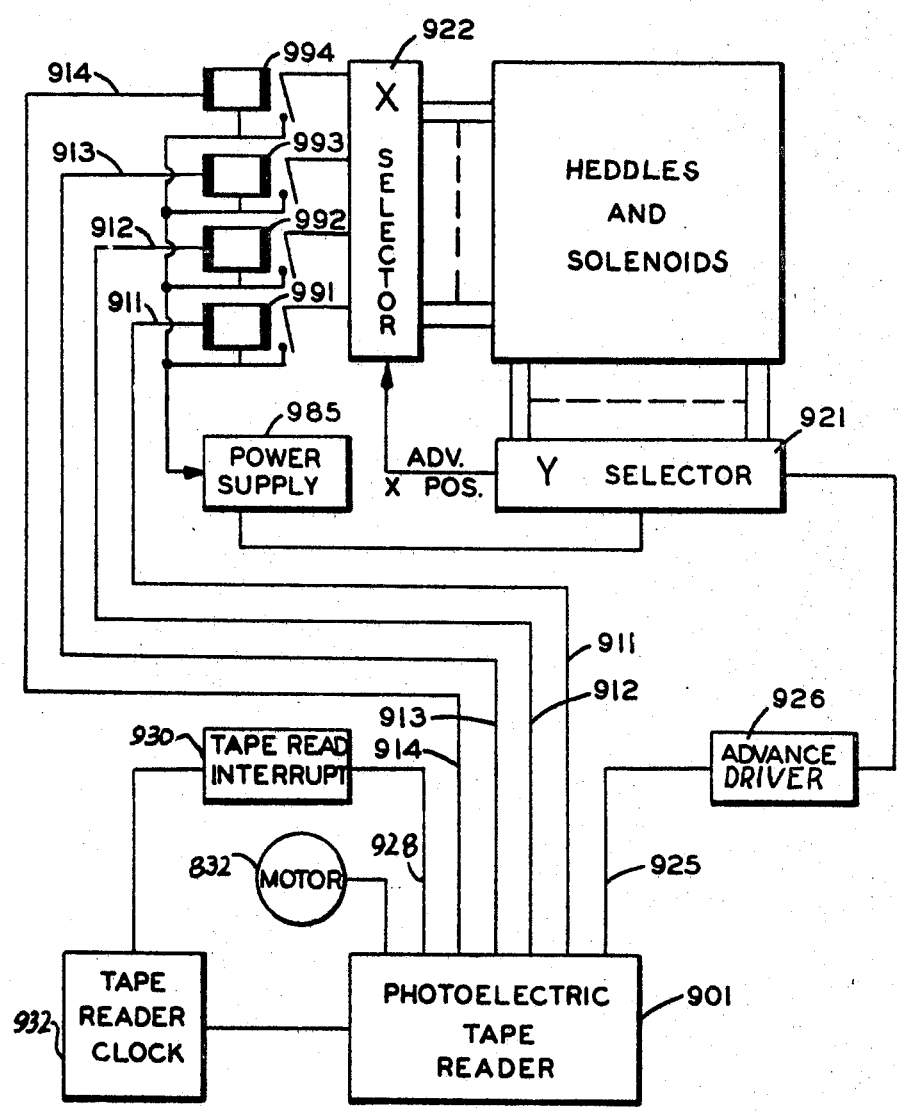

METHOD AND APPARATUS FOR WEAVING MEMORY BRAIDS

This invention relates to typesetting and particularly to a computing machine for producing justified linesetting tape from unjustified tape and to a method and apparatus for making authoritative end-of-line separations without delay of the machine.

Since before the turn of the century, line casting machines have been largely used in the printing and publishing industry. The invention of the line casting machine by Mergenthaler was a giant step in speeding up the composition of type by allowing an operator by keyboard to select and assemble the characters and spaces of a line and automatically forming a mold from which a finished line of type is cast. An operator using a line casting machine converts the typewritten copy which he reads into justified lines by assembling matrices and space bands.

The matrix is a small piece of brass with a letter of the alphabet or some other character recessed into its edge. It is used as a mold to cast the corresponding character in type. A common form of line casting machine contains 90 channels of matrices, one channel for each of the 90 keys on the keyboard. Each channel has a storage capacity for approximately 20 identical matrices. Matrices are dropped from the magazines as the keys are depressed.

A space band comprises two thin wedge-shaped pieces of metal used as spacers between the words of a line. The wedges permit a space band to be expanded. Each space band is dropped in place with minimum thickness and may be expanded at the end of the line for justification. After a line is cast, space bands are separated from matrices and returned to the space band box. The matrices are elevated to a sorting mechanism which sorts and returns them to their channels.

In manual operation the matrices fall by gravity to a conveyor which carries them through an assembling elevator where at the touch of the space band lever space bands are dropped between words. Observing his copy and indicators on the machine the operator relies on his judgment and the knowledge of the amount of space bands expansion available to try justification when an appropriate number of matrices have been assembled. The space bands are expanded and if this fills the line, it is passed on to the casting section of the machine. If the line fails to justify, the operator must add the required extra spacing to the line either by adding extra letters, hyphenating if necessary or by adding additional fixed spacing, which may require resetting the entire line.

In the casting mechanism the matrices are firmly clamped with the space bands forced outward to spread the line to fit the exact column width. Hot-type metal is injected into the mold and sets in the fraction of a second. The slug, as the line of type is called, is ejected, trimmed and dropped into the galley.

In larger printing plants today, line casting machines are operated automatically by a paper-tape-controlled device known as an operating unit. The operating unit is connected directly to the line casting machine keyboard in such a way that the machine can be returned to manual operation by the turn of a lever. An operating unit senses code combinations in the tape and translates them into mechanical action of the machine. The tape supplied to the machine is so-called, justified tape. The judgement of the operator is no longer available at the line-casting machine to supervise the justification and hyphenation as well as other possible malfunctions. Instead of one operator for each line casting machine there is a monitor who tends several such machines and he is concerned only with the mechanical operation of the machine. He need not know how to spell, punctuate or hyphenate. With tape-operated machines the responsibility for justification and end-of-line separations when necessary, is shifted to another operator at another machine called a tape perforator. The operator of the tape perforator for convenience may also be called a perforator. He is a specialist at certain of the duties previously performed by a line casting machine operator; but because he is relieved of the responsibility for the mechanical details of the wonderfully complex linecasting machine he is expected to produce justified copy at a much higher rate than a line casting machine operator and to insert all the necessary format control signals for the line casting machine. Not only must he be fast but he must also be virtually error free since, unlike the line casting machine operator, he is unable to see and immediately correct the consequences of any errors.

The teletype setter (TTS) perforator is the machine most commonly used to prepare justified tape for input to the tape-controlled line casting machine. It has a keyboard resembling a standard typewriter, not the 90 keys of the line casting machine. There is a counting pointer and a space band justification pointer which indicate the amount of space accumulated on the line and the minimum and maximum expansion limits of the space bands. The output of the perforator is a paper tape having up to six holes in a line across the tape to indicate a character, and a line of sprocket holes. The six holes admit of 64 different combinations. One of these provides for a shift from upper case to lower case and another of lower case to upper case whereby the 90 keys of the line casting machine can be operated by the smaller keyboard of the perforator. Noting that the tape perforator operator's job is a dull, routine job which at the same time requires speed accuracy, and a quick mind for hyphenation, the position understandably has been the source of more than its share of labor disputes.

Various prior-art means have been devised to use computers to take over portions of the perforator operator's duties. In one prior-art system, a machine reads unjustified tape and justifies the copy line by line, so long as this can be done without hyphenation. As will be seen from reading a patent copy, only about one line in 10 requires hyphenation. This particular prior-art system stops the machine and refers the hyphenation problem to a human operator. When the operator presses a key to direct the hyphenation, the automatic process is resumed. In this way, one operator can direct several perforating machines, much as one operator monitors several line-casting machines. Unfortunately for this prior-art machine, the requirement for hyphenation occurs randomly on a page. As a result, the requirement for human intervention severely limits the speed which can be obtained with this approach.

Another prior-art approach is to provide the machine with rules of thumb which cover most words, and trust to luck, the readers' forebearance for the remainder.

A still further approach features a small list of commonly used exceptional words stored in the memory of the computer to eliminate the more frequent and more glaring errors of the just-mentioned approach. According to prior-art arrangements of special-purpose typesetting computers, the provision of an adequate word list which can be scanned rapidly has proven to be impractically expensive.

A still further prior-art approach has been to make use of a large word list and a large general-purpose computer. To be economically attractive this requires either that the computer be shared by a large number of typesetters working day and night, a situation not found in many newspapers, or that the computer be shared by other departments of the newspaper such as circulation, pay-roll, etc. Sharing the computer aggravates the problems with trade unions already made acute by the development of new processes.

The present invention primarily departs from the prior-art providing rapid access to a large word list as a guide to hyphenation. The hyphenation problem exists whether a hot type or cold type (Photo-Offset) process is employed. The mechanism for stretching the copy to fit the line differs in details from one process to the next.

The invention is herein described as it is applied to provide justified linecasting tape from format coded, unjustified tape. In its broader aspects the invention embraces processes for high speed type composition by photographic means as exemplified by machines known as Phototype. However, since photographic processes may employ any of several different means for expanding a line for justification, the details of the machine logic required modification for each kind of machine for which tape is prepared. Moreover, by modification of the machine as exemplified by the detailed specification herein one computer may control the perforation of tapes for either hot or cold type process, or both simultaneously.

It is a feature of the invention that the format instructions are received by the computer as specifications in terms of the final printed output material and the machine interprets the instructions to produce tape with all proper hyphenations and with insertion of line casting machine control functions, thus allowing perforator operators to concentrate on speed and accuracy in transcribing the copy. Another feature of the machine is a computation system built around two identical sonic delay lines one for storing the copy being transformed, the other containing column-width and column-length specifications and the accumulated length of a line being set together with available space band expansion.

Another object of the invention is to provide a typesetting computer which can justify any font.

An important feature of the invention is the provision of a non-erasable permanent dictionary file giving authoritative end-of-line separations for all words in common usage without the use of probablistic rules and justification by faith. A feature of the hyphenation memory is rapid access to the hyphenation memory without delay in the copy flow. A further feature of the hyphenation memory is a grouping of memory sections for words having different priorities for search.

A further object of the invention is to provide a typesetting computer, having a memory the storage elements of which may be automatically and inexpensively fabricated by machine; and it is a further object to provide a machine for so fabricating the storage elements.

Other objects and features of the invention will in part be obvious and in part will be comprehended by reference to the following specification and annexed drawings of which:

Figure 4B:
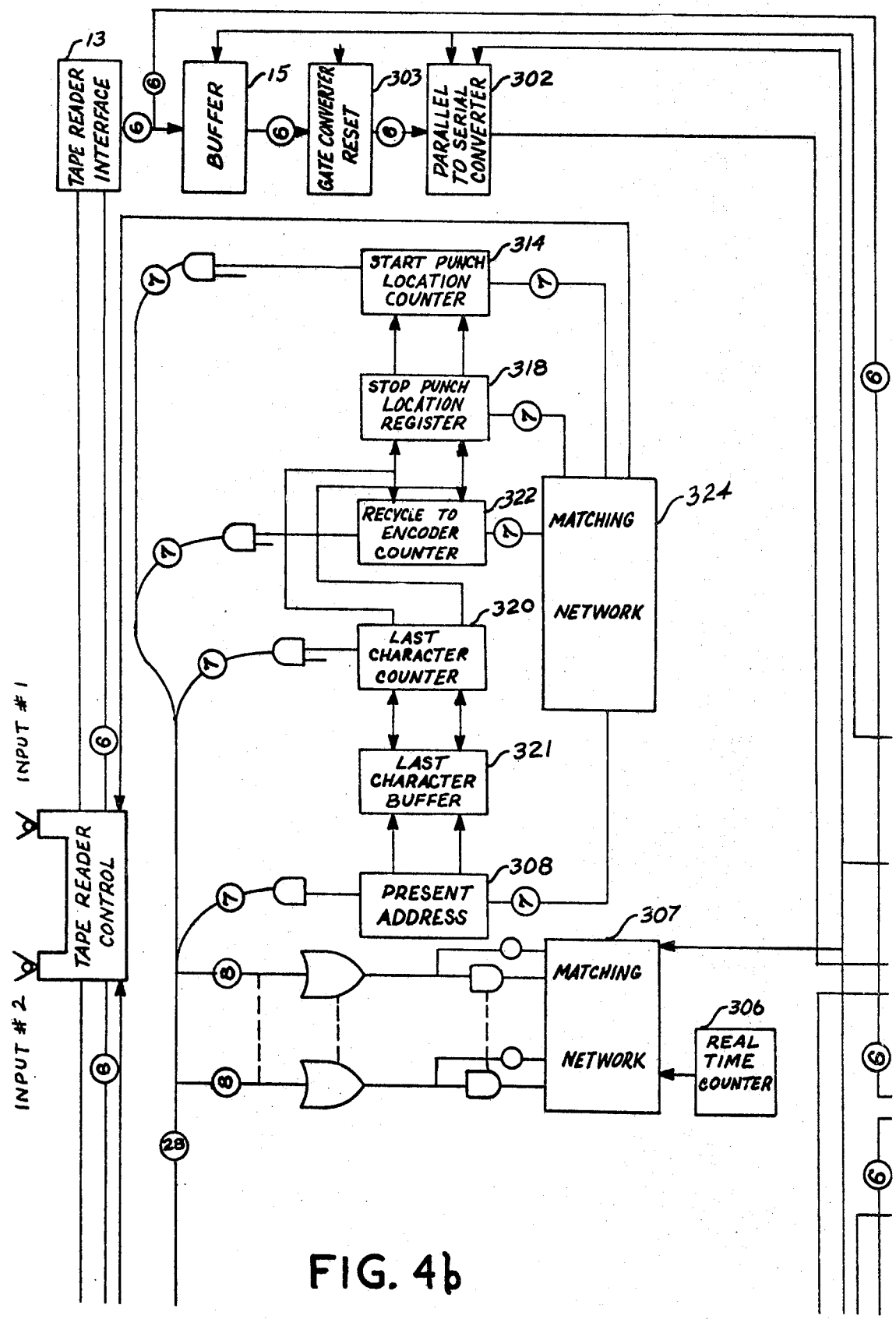
Figure 4C:
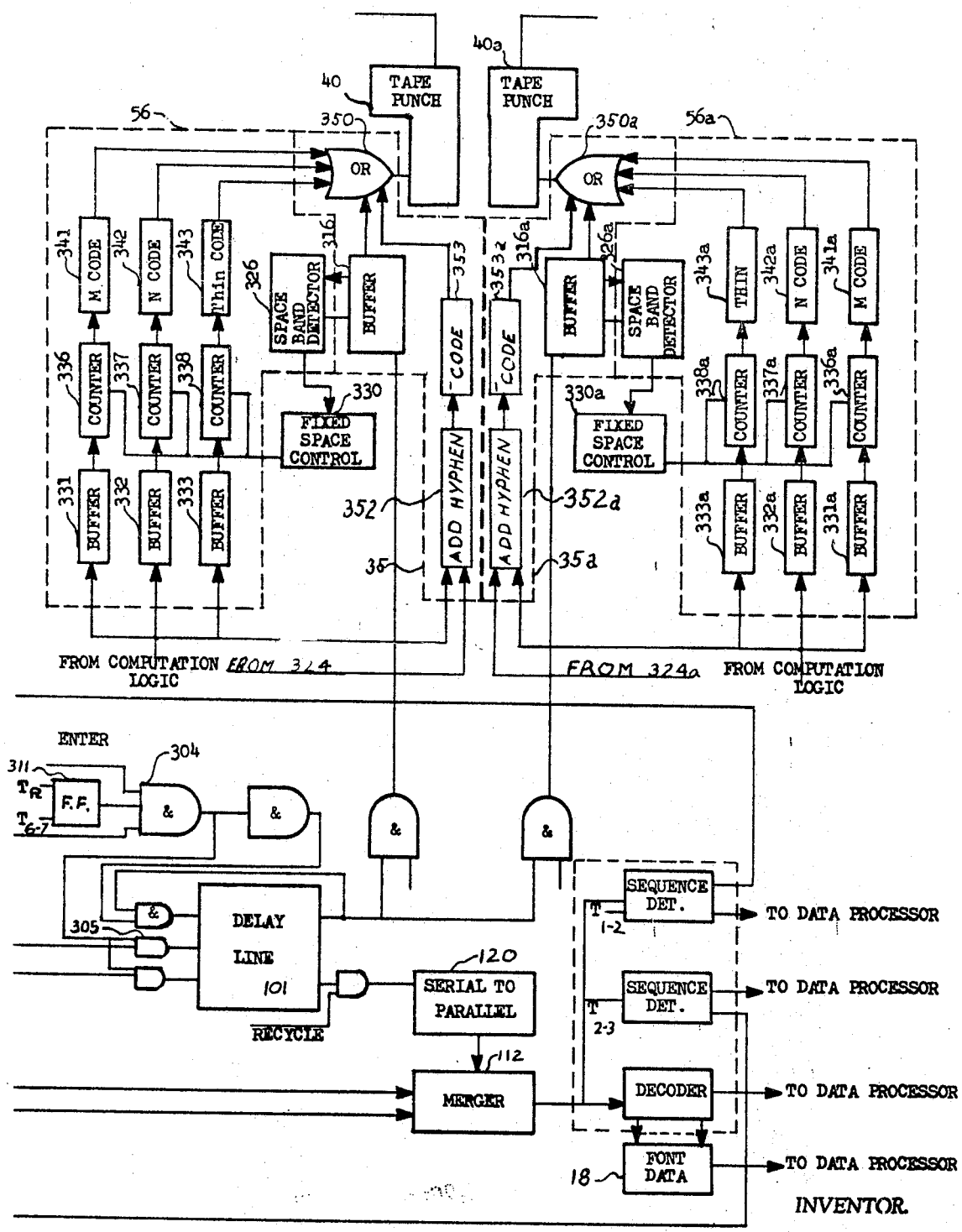
Figure 5:
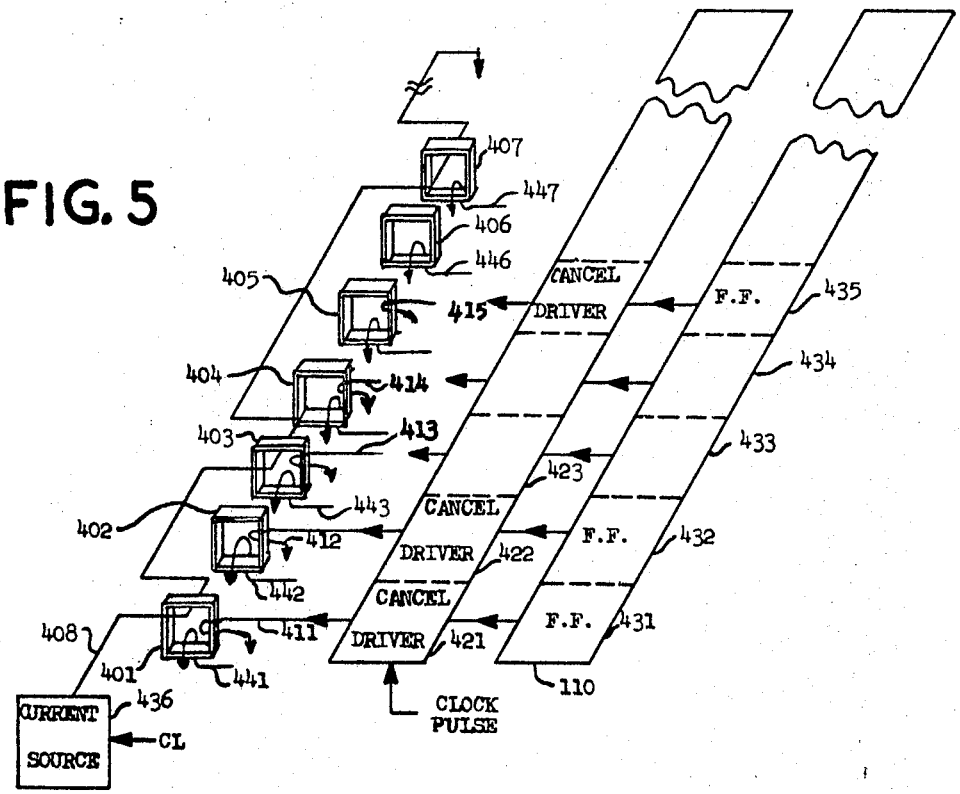
Figure 5A:
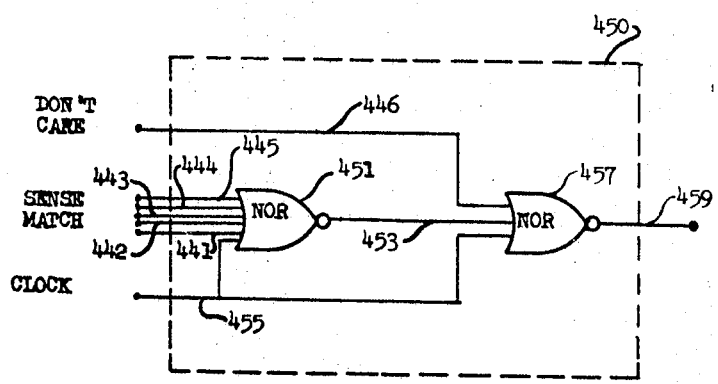
Figure 8:
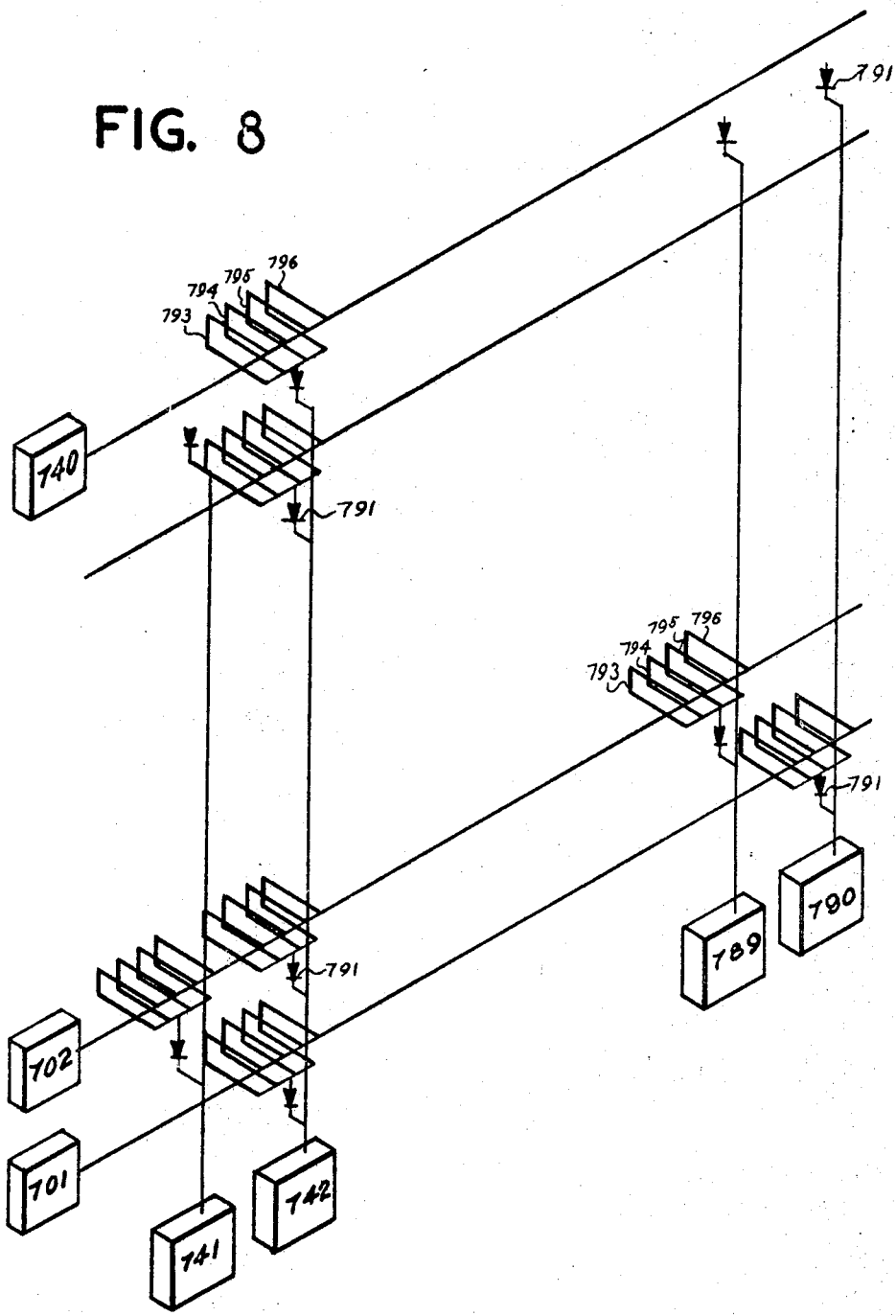

FIGS. 4a, 4b and 4c, when placed together as shown in FIG. 4, is a block diagram showing specific detail of the copy storage section and of the computer and hereafter referred to as FIG. 4;

FIG. 5 is a schematic diagram illustrating a feature of the hyphenation memory;

FIG. 5a is a logic diagram relating to FIG. 5;

FIG. 6 is a logic diagram of circuitry linking that of FIGS. 5 and 7;

FIG. 6a is a schematic diagram of the hyphenate enable circuit of FIG. 6;

FIG. 7 is a logic diagram of the hyphenation memory system of the computer;

FIG. 8 is schematic diagram of the wire braid memory of FIG. 7;

FIG. 9 is a schematic side elevation view of a loom for braiding core ropes for the memory of FIG. 8;

FIG. 9a is an illustration of a portion of the rope as braided by the machine of FIG. 9;

FIG. 10 is a block diagram of the control system for the loom of FIG. 9; and

FIG. 11 is a detail of a portion of the diagram of FIG. 10.

Figure 1:
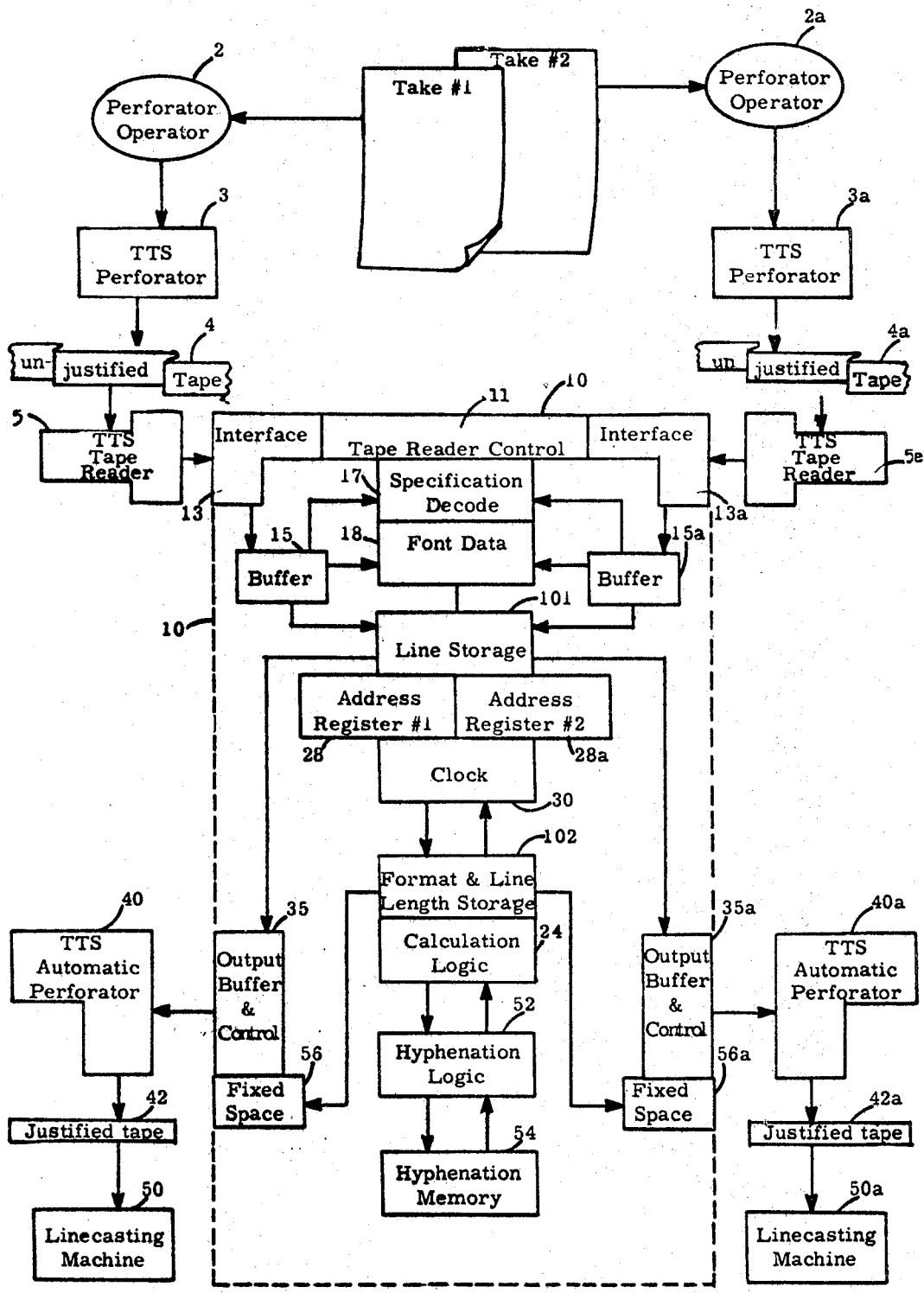
FIG. 1 is a flow chart for the computer of the invention together with accessory equipment.

Before explaining how the computer operates it may be well to relate what it does in the composing room. FIG. 1 represents the process involving the invention from the receipt of marked-up copy from the newsroom until the galleys of type are cast. In the illustrated embodiment described herein one computer serves two channels of information, the operation of the second channel is identical in principle to the first channel although it may even use a different font of type and in other ways follow different detailed specifications. The description is set forth as applied to the first channel. Corresponding reference characters for the second channel bear a suffix a. Thus the perforator operator 2 who receives from the newsroom the marked-up copy containing the general instructions as to the length of the story and how it is to be played has the counterpart in the operator 2a who handles the second take or story from the newsroom. The operator 2 sits at the keyboard of a machine 3 called a teletypesetting (TTS) perforator. The keyboard of this machine is similar to that of a typewriter, the keys represent either characters or functions such as shift up and shift down, rub out and bell. The output is a perforated paper tape 4 in which each character is represented by a pattern of up to six holes spaced cross-wise of the tape one line of holes for each character or function. Because there are only 64 possible output combinations; and it is the responsibility of the operator to put on the tape, not only the story to be set, but also the instructions for its format, an artifice is employed whereby the letters of the alphabet serve double duty to direct instructions. The dollar sign ($) is used to introduce an instruction sequence. A dollar sign ($) followed by a letter is a forbidden code in the normal context, hence it may be used to introduce an instruction sequence by which the operator 2 directs the program of the computer. The tape 4 produced by the operator is removed from the perforator 3 and installed on a related machine 5 termed a tape reader. It should be noted that the coded output of the perforator 3 may be transmitted by wire or wireless to produce the actual tape at a remote location. The tape reader 5 provides the necessary mechanical means for advancing the tape a character at a time and for transmitting on six wires the code corresponding to the six hole positions. In addition, it produces a synchronizing pulse accurately timed relative to the presentation of the successive characters.

Because the tape reader 5 a mechanical device, cannot have the microsecond accuracy in timing of the computer 10 and because the computer is not always ready to accept new information from the tape reader, it is necessary to have a control 11 and interface circuiary 13 by which at the proper time a character is introduced into the buffer 15 from the tape reader 5. Here the character is examined by the specification decoding unit 17 which is concerned with characters forming part of a format control sequence and if it is a letter of copy, it is recognized by the font data storage 18 which transmits the corresponding width of the character to the calculation logic 14; and the character is placed in temporary line storage delay line 101. Its position in the line is kept track of by one of several address registers 28. The coordinate of the various entries in the delay line 101 is the time of entry as indicated by the clock 30. Characters are accumulated on the line 101 and their widths are accumulated on a second delay line 102 until calculations show that the line has been overset (or is about to be overset but can now be justified by spaceband expansion). In the latter case the line is read out through the output buffer 35 which feeds an automatic tape perforator 40 which generates justified perforated tape 42 which in turn controls the functions of the line casting machine 50. If on the other hand, the line is overset, hyphenation of the last word may be desirable. The word is copied into the hyphenation logic section 52 and there compared with the syllabification information of all of the words of a standard dictionary such as Webster's Collegiate Seventh Edition, stored in the hyphenation memory 54 from which it is determined if and where the last word may be divided. The justification calculation logic 24 then determines whether hyphenation, fixed spacing, or a combination of these, best fills out the line. When fixed spacing is called for, the amount of it is set into the fixed space counters 56 of the output control section 35 for insertion between words as they are read out of the computer.

Figure 2:
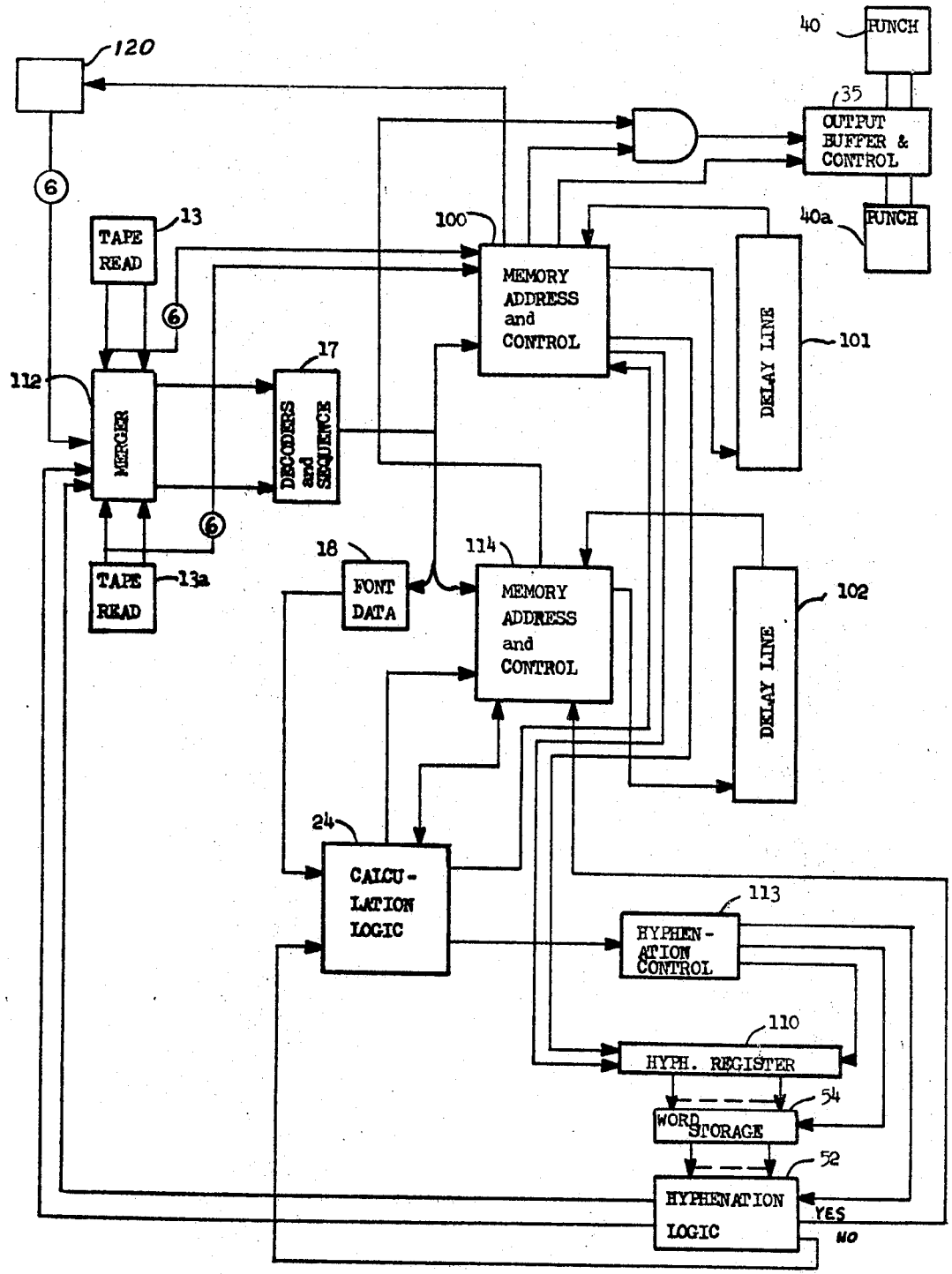
FIG. 2 is a more detailed block diagram of the general organization of the computer.

FIG. 2 is a flow chart further elaborating the channels of information flow within the computer. There are two overlapping and interrelated, but not intermingled data patterns. One is the pattern of actual characters to be set into type and the other is the information on the width of these characters and the width, number, and spacing of the lines into which they are to be set. Copy entering the computer through tape interface 13 goes to the memory and control circuitry 100 whence it is introduced at the correct time into the delay line 101 from which it is presently discharged via the output buffer control circuit 35 unless hyphenation is called for; in which case a word is routed to the hyphenation register 110 for processing by hyphenation control 113. Input data from both channels is presented by the merger 112 to the decoder and sequence recognition logic 17. This circuitry recognizes such significant event as the end of a paragraph, the occurence of a space band, the occurence of a numeral in a specification which has to be converted to binary etc. Decoded instructions control the operation of the delay line 101 as well as the memory address and controls circuitry 114 responsible for placing the format control specifications in the proper places in the delay line 102. As each letter is entered into delay line 101, its width as reported by the font data 18 to the calculation logic 24 is subtracted from the line length remaining as the necessary calculations for justification are carried out. Feed back of letters from the hyphenation logic 52 through the merger 112 and the decoder 17 to the font data store 18 is necessary as calculations are carried out to select the optimum piece of word for end-of-line separation.

TIMING

The computer to be described is organized around two ultrasonic delay lines 101 and 102 each of which stores exactly 2,048 bits with a bit rate of two million bits per second. The basic frequency standard for the system is a two-megacycle crystal-controlled oscillator. With temperature-control each magnetostrictive delay line maintains its inherent delay constant to a small fraction of a microsecond, so that with compensating variations in the electronic delay of the pulse reshaping and recirculating circuitry of the line, the line at all times maintains its exact capacity in bits.

From a practical point of view it is important to make the system compatible with the existing tape perforators and tape readers. These are synchronized to the public utility power frequency and handle approximately 105 characters per second. It was considered undesirable to modify the drive system for the readers to synchronize them exactly with the crystal frequency standard. Instead, the delay line length was selected to recirculate the data not quite 10 times for each character handled by the tape reader 13 and tape punch 40. The delay line period is 1.024 milliseconds per cycle. The tape reader presents one new character every 9.5 milliseconds.

The tape reader, by means of its own internal electronics, presents successive characters at the tape punch interface as levels on six output lines. It also produces a synchronizing pulse derived from a magnet on its fly wheel. The synchronizing pulse is designed to occur at the *middle* of the presentation time for each successive character. Thus approximately 4.7 milliseconds after the occurence of the synchronizing-pulse, the output leads of the tape reader switch to their new configuration. The computer samples the output of each tape reader once every 10 delay line cycles. It will be clear that characters may be misread or lost only when the time for sampling occurs very near 4.7 milliseconds after the synchronizing pulse.

Synchronous reception of characters from the asynchronous tape reader is achieved by circuitry which jumps the sampling time ahead by about one millisecond when the synchronizing pulse indicates possible misreading if sampled at the regular time, and maintains an equal number of characters by then stopping the tape reader for one cycle. For convenience in relating functions one to another in the operation of the machine, a convention has been adopted illustrated by FIG. 1a and Table I to designate the time and duration of all functions relative to the time when a character is entered into the parallel-to-serial converter 303. A first time interval T is designated $T_0-_1$. During this period the character is converted from TTS to binary code and the format instructions, if any, are entered into the delay line 102. The next circulation of the delay line designated $T_1-_2$ is occupied with entering characters into delay line number 101. The period $T_2-_3$ is occupied with the start of the justification process and the completion of justification without hyphenation. $T_3-T_4$ and $T_4-_5$ are occupied with hyphenation. $T_5-_6$ marks the beginning of the routine for the second channel with the entering of instructions from the second tape reader into the delay line 102a time $T_6-_7$ is devoted to reading copy into the delay line 101a time $T_7-_8$ justification for the second channel $T_8-_9$ and $T_9-_0$ for hyphenation of the second channel.

Ordinarily the tape reader for channel 1 is sampled at $T_9-_0$ but if the synchronizing pulse is observed to occur in $T_4-_5$, then the sampling is moved up to $T_8$ and before the machine can stop, a second sample is taken and stored in a misread buffer not shown which stores the next character in line, which is subsequently entered into the buffer 15 during the following $T_9-_0$ period. Similarly the tape reader for channel 2 is ordinarily read in at $T_4-T_5$. The so-called misread sample is taken at $T_3-_0$. In the timing diagrams a pulse is designated by the time interval in which it starts, a second number (of 3 digits unless zero) is the number of microseconds into the time period when the pulse starts and third designator indicates the width of the pulse in microseconds. Thus $T_{7.366.512}$ is a pulse in the

TABLE I

| Number | Time | Function |
| --- | --- | --- |
| 121 | 7.366, 512 | Read from buffer 301 to converter 302. |
| 122 | 8, 1536 | Sample character from reader 5 and put into buffer 301 decoders, and sequence circuits 17. Let this character be a space band. |
| 123 | 0, 1024 | Decrement width from DA1 on 102. |
| 124 | 1, 1024 | Read from parallel to serial converter 302 to correct address on 101. |
| 125 | 4, 1024 | Unload character from 101 to punch buffer 35. |
| 126 | 7.366, 512 | Read space band from buffer 301 to parallel to serial converter 302. |
| 127 | 8, 1536 | Same as 122. |
| 128 | 0, 1024 | Check sign of DA11. If positive, as it is this time, transfer DA11 to DA21 transfer read present address counter 308 to last character counter 320. |
| 129 | 1, 1024 | Decrement width of space band on 102. Load character onto 101. |
| 130 | 2, 1024 | Update expansion registers. |
| 131 | 4, 1024 | Unload previously loaded character from 101 to punch buffer 35 check if space band. |
| 132 | 7.366, 512 | Same as 121. |
| 133 | 8, 1536 | Same as 122. |
| 134 | 0, 1024 | Same as 123. |
| 135 | 7.366, 512 | Same as 126. |
| 136 | 8, 1, 512 | Same as 122. |
| 137 | 0, 1024 | Check sign of DA1. Negative this time. |
| 138 | 1, 1024 | Unload last word from 101 to hyphenation register 110 unload DA21 to DA31, 211. |
| 139 | 2, 2048 | Start hyphenation procedure and get hyphenated word. |
| 140 | 4, 1024 | Inhibit tape reader 5. |
| 141 | 4, 1024 | Unload space band from 101 to punch buffer 35. |
| 142 | 0, 4096 | Try hyphenations until justified. |
| 143 | 4, 1024 | Punch fixed spacing. |
| 144 | 4, 1024 | Punch until line finished. |
| 145 | 5.5120 | Transfer new line up to punch counters 56. |
| 146 | 0, 3072 | Get new line set up—column width, indents, etc. |
| 147 | 3, 1024 | Start to recycle remaining characters. |
| 148 | 4, 1024 | Unload from 101 to punch buffer 35. |
| 149 | 0, 1024 | Recycle another character. |
| 150 | 3, 1024 | Recycle last character. |
| 151 | 7.366, 512 | Read from 301 to parallel to serial converter 302. |
| 152 | Continue | |
| 241 | 9, 1024 | Unload from 101 to punch buffer 35. |
| 242 | 2.366, 512 | Read from buffer 301a to converter 302a. |
| 243 | 3, 1536 | Sample character from reader 5a ($) and put through decoders, sequence circuits 17a. |
| 244 | 5, 1024 | Decrement width from DA12. |
| 245 | 6, 1024 | Read from converter 302 onto 101. |
| 246 | 7, 1024 | Unload to punch buffer 35a. |
| 247 | 2.366, 512 | Read $ from 301a to converter 302a. |
| 248 | 3, 1536 | Read c as character from reader 5a to 301a and decoders and sequence circuits 17a. |
| 249 | 3, 1536 | Inhibit shift from converter and destroy information in converter and 301a. Inhibit read into converter until end of instruction. |
| 250 | 9, 1024 | Same as 241. |
| 251 | 3, 1536 | Sample (12) from reader 5a into 301a, decoders 17a. |

| Number | Time | Function |
| --- | --- | --- |
| 252 | 5, 1024 | Generate correct binary number. |
| 253 | 6, 1024 | Store in 102. |
| 254 | 9, 1024 | Same as 241. |
| 255 | 3, 1536 | Read (-) as character. Change reference address and control sequences. |
| 256 | 7, 1024 | Same as 241. |
| 257 | 3, 1536 | Read number from reader 5a. Convert to binary. |
| 258 | 5, 1024 | Generate binary number corresponding to width specified for character read. |
| 259 | 6, 1024 | Same as 253. |
| 260 | 9, 1024 | Same as 256. |
| 261 | 3, 1536 | Same as 257. |
| 262 | 5, 1024 | Same as 258. |
| 263 | 6, 1024 | Same as 259. |
| 264 | 9, 1024 | Same as 256. |
| 265 | 3, 1536 | Read (.)—change control sequence. |
| 266 | 9, 1024 | Same as 256. |
| 267 | 3, 1536 | Same as 261. |
| 268 | 5, 1024 | Same as 262. |
| 269 | 6, 1024 | Same as 263. |
| 270 | 9, 1024 | Same as 256. |
| 271 | 3, 1536 | Same as 261. |
| 272 | 5, 1024 | Same as 262. |
| 273 | 6, 1024 | Same as 263. |
| 274 | 9, 1024 | Same as 256. |
| 275 | 3, 1536 | Same as 265, except (,) instead of (.). |

Figure 1A:
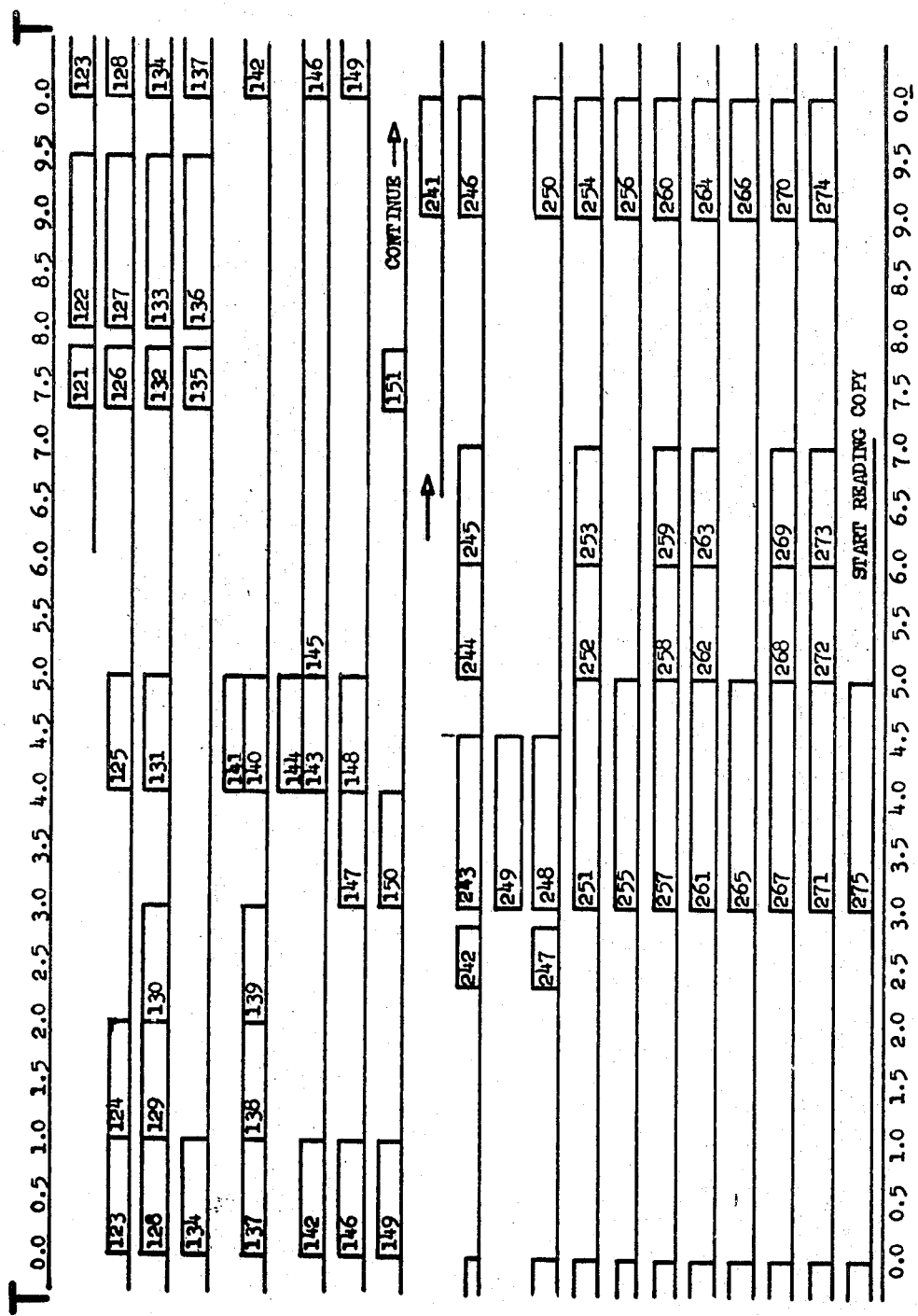
FIG. 1a is a timing diagram for the functions of Table 1 in the computer of FIG. 1.

Start reading copy time period $T_{7-8}$ beginning 366 microseconds after the period begins and lasting for 512 microseconds, but T1,1024 starts at 1.000 and continues until 2.000. Table I lists a series of typical sequential steps for the computer; and FIG. 1a is a timing diagram illustrating the relative times of occurences related to the 10 basic timing intervals as just described.

Time runs from left to right and top to bottom. Events 121—152 typify justification and copy handling operations. Events 241—275 encompass the entry of format instructions.

SPECIFICATION AND COMPUTATION SECTION

Figure 3:
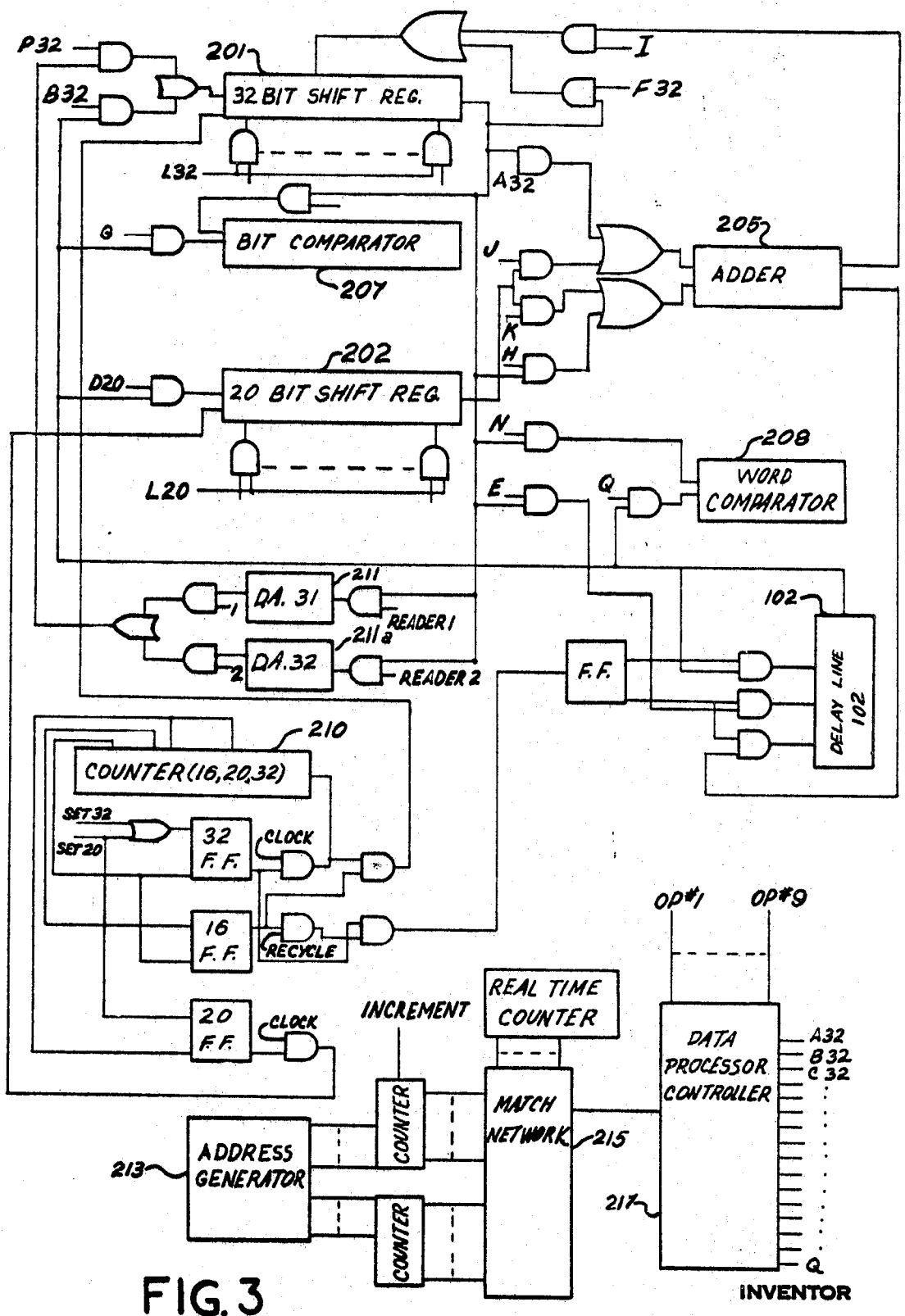
FIG. 3 is a block diagram showing specific detail of the specification and computation section.

Referring now to FIG. 3 the computation delay line 102 is the center of the logical and computational functions of the computer.

It has associated with it seven registers which perform significant functions. There is a 32-bit register 201 which is used as a 32-bit buffer. It is arranged for serial or parallel input and for serial output. A 20-bit register 202 also serves as a buffer and also is arranged for serial or parallel input and serial output. These registers 201, and 202 are associated with an adder 205 which has variable logic to permit it to add the 32-bit register 201 to the 20-bit register 202 or to add a number from the delay line 202 to either of these. The sum output of the adder 205 may be controlled by the logic to enter into either the 32-bit register 201 or the delay line 102. The third register 207 is arranged as a bit-comparator, which can compare any one of 32 bits in the 32-bit register 201 with up to 32 bits in the delay line. For example, to determine whether the first bit in an address on delay line 102 is a one, a one is set into the first bit of the 32-bit register 201 which is then read out serially with the addressed content of line 102 through the bit comparator.

The fourth register is the word comparator 208 which can compare a total word on the delay line 102 with a word that is in the register 201.

The fifth register is a counter 210 which counts to 16 and to 32 to govern the shifting of registers 201 and 202.

The sixth and seventh registers are deficit accumulators (DA31—DA32) 211 and 211a for the hyphenation routine of the first and second channels respectively.

These registers and the adder, together with controlling logic including an address generator 213, match network 215 and data processor controller 217 perform all the functions in connection with the computation delay line 102.

The delay line is purchased as an article of commerce supplied complete with transduces and amplifiers. For the preferred embodiment described herein a magnetostrictive line manufactured by Computer Control Corporation, Framingham, Mass., is preferred. It has a capacity for 2,048 bits which are recirculated every 1.024 milliseconds.

The delay line 102 is operated as a fixed address memory having 128 time blocks each of 16 bits length into which information is placed. These blocks are termed registers although it will be understood that there is no fixed structure connected with these registers. At any given instant a particular part of the delay line will contain the register, but the stress pattern that stores the information moves around the line with the speed of sound. Line-length information requires more than 16 bits for storage. This is assigned double-length registers of 32 bits. This accounts for the number of bits in register 201. Other column specifications are allotted 16 bit addresses each.

The address generator 213 produces gates at the right time to read in or read out information from the delay line 102.

The various operations which may be performed are the following:

1. A word may be serially read out of register 201 into any addressed register of the delay line 102;
2. 32 bits of a word in the delay line may be read serially into the register 201;
3. A 16-bit word in the delay line 102 may be read serially into the register 201;
4. 20 bits from delay line 102 may be read serially into the register 202;
5. The contents of a register in delay line 102 may be added serially to the content of register 201 and the sum stored either at the address on the line or in the register 201;
6. The content for register 201 can be added to the content of register 202 and the sum stored in either register 201 or a selected register of delay line 102;
7. The content of register 202 may be added to the content of a register in the delay line 102 and the sum stored either in the delay line 102 or in the register 201;
8. A full word, either 16 bits or 32 bits, on delay line 102 may be compared with the bits of register 201;
9. Any bit of register 201 may be compared with the corresponding bit of a register of delay line 102;
10. Words may be read from register 201 into either DA31 (211) or DA32 (212); and
11. Words may be read from DA31 or DA32 into register 201.

As mentioned above, different fonts of type may be set by typesetting machines. In any one newspaper a relatively small number of fonts are available for line-casting machines, more are usually provided for cold-type machines. Provision is made in the preferred embodiment for 10 fonts, far more than the average. In each font every letter has associated with it a certain width, an Em is ordinarily wider than En, which is wider than an El. In the point system of typography each letter has an integral number of points, there being 12 points to a pica and very nearly six picas to an inch.

For convenience, therefore, each unit of line width in the line width specification is made to correspond to about one ten thousandth of an inch one one hundred thirty-ninth of a point. With this degree of precision in the specification of character width, fonts are freed from the point system and any fonts may be used, and greater flexibility in photo processes is gained.

In any given font, however, it may be expected that only a small number of different widths will be used for the characters in the font. A font card is a logic circuit board which is plugged into the font information store and represents an available font of type. The input to the card is the six-bit binary number representative of the character plus a seventh bit which shows whether upper case or lower case. The output is a binary number which represents the width of the character. Some fonts have as many as 25 different widths. As each character is read onto the delay line 102, the width of the character is read in parallel from the font board into the register 201, where it is processed as explained below.

Since the circulating time of the memory, which is the basic time interval of the computer, is only 1.024 milliseconds, there is a great disparity between the speed of the electronic computer and the speed of the electromechanical paper tape punches and tape readers which operate at a speed of about 100 characters per second. Because of this, the preferred embodiment of this invention serves two tape readers and two tape punches. Reference to the two sides of the machine appear throughout this specification; but it will be apparent that a machine could be built with only one channel or with more than two.

In the preferred embodiment, the registers in delay line 102 are assigned as follows. The first 72 registers of 16 bits each are filled with column length specifications, (CLS) column width specifications (CWS), and indentation instructions, for length and width of indentation and left, right, and both (center).

In Table II that follows CLS11 indicates the first column length specification for tape number one. CWS12 indicates first column width specification for tape #2. ILL 21 indicates the second indentation length instruction for the left margin, tape 01 and ICW21 stands for the second center indent width instruction for tape 01. Table II designates the register assignments for the preferred embodiment, which is typical.

As mentioned above in connection with the starting routine, the column specifications are entered into the machine at the start of a take. Address 01 contains the first column length specification, which may call for any number of lines up to 99. It is entered into the machine by format control immediately after the $¢ identifier. The next specification to be entered is the column width specification which is assigned the next two registers. There are four of these length specifications and four width specifications for each of the two takes which take up the first 24 registers. Similarly indent instructions are stored which specify the amount of white space to be left at the left, right, or both ends of the line. These various instructions may take up to 72 addresses. Register #73 is the first of 16 spacing registers, eight for each channel. A line-casting machine makes provision for spacing between words by an expandable space band and by space band plus fixed spacing which is designated Thin, N, and M in order of increasing width. Whenever the space band character appears it is entered on the copy line and its minimum width is subtracted from the line width remaining in DA11 or DA12 delay line 102. At the same time, the amount of additional spacing which might be entered by expansion plus any combination of a maximum of one of each of the three types of fixed spaces is accumulated. Registers 73 through 80 store the amount of spacing available by these combinations in order of decreasing width. Register 80 contains the amount of width to be gained by space band expansion only. Registers 81 through 88 contain the same information for the line being set from the second tape 4a.

Registers 89 and 90 together constitute the first deficit accumulator (DA11) for the first tape 4. At the beginning of each line this register received the content of the line width specification designated by format control. As each character is entered on line 101, its width is subtracted from DA11. Thus it contains essentially a measure of the amount of line remaining to be set. The second deficit accumulator for tape 4

TABLE II

| Address | Content | Address | Content |
|---|---|---|---|
| 1 | CLS11. | 59 | ICL21. |
| 2 | CWS11. | 60 | ICW21. |
| 3 | | 61 | ICL31. |
| 4 | CLS21. | 62 | ICW31. |
| 5 | CWS21. | 63 | ICL41. |
| 6 | | 64 | ICW41. |
| 7 | CLS31. | 65 | ICL12. |
| 8 | CWS31. | 66 | ICW12. |
| 9 | | 67 | ICL22. |
| 10 | CLS41. | 68 | ICW22. |
| 11 | CWS41. | 69 | ICL32. |
| 12 | | 70 | ICW32. |
| 13 | CLS12. | 71 | ICL42. |
| 14 | CWS12. | 72 | ICW42. |
| 15 | | 73 | Exp.+M+N+thin 1. |
| 16 | CLS22. | 74 | Exp.+M+N 1. |
| 17 | CWS22. | 75 | Exp.+M+thin 1. |
| 18 | | 76 | Exp.+Em 1. |
| 19 | CLS32. | 77 | Exp.+En+thin 1. |
| 20 | CWS32. | 78 | Exp.+En 1. |
| 21 | | 79 | Exp.+thin 1. |
| 22 | CLS42. | 80 | Exp. 1. |
| 23 | CWS42. | 81 | Exp+M+N+th 2. |
| 24 | | 82 | Exp+M+N 2. |
| 25 | ILL11. | 83 | Exp.+M+th 2. |
| 26 | ILW11. | 84 | Exp.+M 2. |
| 27 | ILL21. | 85 | Exp+N+th 2. |
| 28 | ILW21. | 86 | Exp+N 2. |
| 29 | ILL31. | 87 | Exp.+th 2. |
| 30 | ILW31. | 88 | Exp. 2. |
| 31 | ILL41. | 89 | DA11. |
| 32 | ILW41. | 90 | |
| 33 | ILL12. | 91 | DA21. |
| 34 | ILW12. | 92 | |
| 35 | ILL22. | 93 | DA12. |
| 36 | ILW22. | 94 | |
| 37 | ILL32. | 95 | DA22. |
| 38 | ILW32. | 96 | |
| 39 | ILL42. | 97 | |
| 40 | ILW42. | 98 | |
| 41 | IRL11. | 99 | |
| 42 | IRW11. | 100 | |
| 43 | IRL21. | 101 | |
| 44 | IRL21. | 102 | |
| 45 | IRL31. | 103 | |
| 46 | IRW31. | 104 | |
| 47 | IRL41. | 105 | |
| 48 | IRW41. | 106 | |
| 49 | IRL12. | 107 | |
| 50 | IRW12. | 108 | |
| 51 | IRL22. | 109 | |
| 52 | IRW22. | 110 | |
| 53 | IRL32. | 111 | |
| 54 | IRW32. | 112 | |
| 55 | IRL42. | 113 | |
| 56 | IRW42. | 114 | |
| 57 | ICL11. | 115 | |
| 58 | ICW11. | 116 | |

(DA21) is assigned registers #91 and 92. As will be explained below, it is used to store the content of DA11 under certain circumstances to be explained below. Registers 93 through 96 are occupied by deficit registers DA12 and DA22 for the second tape 4a. The remaining 32 registers are reserved for expansion and elaboration of the machine.

The following operations accomplish justification. The specifications are entered into the registers 1—72 and copy follows. The content of registers 2 and 3 of delay line 102 are entered into the register 201 and copied into registers 89—90.

As the copy follows, characters are added to the line 101 and at the same time the character width is entered in parallel into register 202. The number in register 201 is then subtracted from the content of DA11 by the adder 205 and the difference returned, bit-by-bit immediately to registers 89—90. When a space band is received, several functions are triggered by the logic. First it is entered as a character on line 101. Then a 1 is entered into the first bit register 201 and its content compared with register 89—90. If the comparison indicates the deficit accumulator has turned negative, the line is overset (not very likely at the end of the first word) in which case the consequences will be described below. When the number in DA11 is tested positive it is read out into register 201 and then copied from register 201 into DA21 in registers 93—94 and also by end-around shift retained in register 201 and further the minimum space band width is decremented. The contents of register 201 as minuend is repeatedly passed to adder 205 and at the same time recirculated by end around shift. In this way the number is successively compared with the contents of registers 73—80 as subtrahends. When none of the subtrahends excede the minuend, content or register 201 is returned to DA11 and the reading of copy continues until the next space band is reached. If only one of the subtrahends exceed the minuend, the line is justifiable by space band expansion alone. A signal goes to the copy control section to print out the line, and DA11 is loaded with the specified width for the next line.

The results of the successive comparisons of the spacing subtrahends from the deficit accumulator DA11 are stored in flip-flops and represent possible justifications for the line if hyphenation does not produce a better result. Leaving these flip-flops set, the reading of copy continues until the next space band is reached. This time checking DA11 will probably show that the line had been overset; (if the added word is very short, perhaps not) and the process is repeated as above. The count to the end of that word is transferred to DA21 and the flip-flops are updated. But when the line is overset by a spaceband, the content of DA11 is not transferred to DA21, it is of no further use. Rather attention turns to the content of DA21 which holds the line length remaining at the end of the last full word. This is copied out into Register 211. (It can't be more than 16 bits.)

Attention also turns to the last word which oversets the line. It is copied out of delay line 101 into register 110 which is a shift register of 100 bits capacity. Since only letters are involved in words to be hyphenated, only five bits per letter are required and the first 20 letters of a word may be considered, except that an end-of-line separation may not be made between 16th and 20th characters.

The hyphenation system, as will be explained below compares the word in register 110 with over 30,000 root words in storage and if there is a match almost instantaneously sets a shift register to indicate the characters after which hyphenation is permissible, as after the third, fifth, and seventh letters. With this information, and with the content of DA21 held in register 201, the justification problem is resolved, usually within two circulations of the delay line. The characters of the word in register 110 are referred to the font cards, the width of each entered into register 202 is subtracted in turn from the deficit accumulated in register 211 until the longest hyphenation point is reached. If the line is overset on reaching the longest hyphenation point, as determined by checking sign on register 211 the registers are reset and a second trial is made at the next hyphenation point. In this way successively shorter pieces of the word in register 110 are tried. If the line is not overset the remainder in register 211 is compared to the contents of registers 73—80. If any of these spacings is enough to fill the line, the process is over, and the line is justified with the indicated spacing, since this places the longest available part of the word on the line.

If none of these spacings are enough to fill the line, register 73 minus register 80 (correspondingly for tape 4a registers 81 minus 88) on delay line 102 are subtracted from DA31 (211) and control registers in the punch out circuitry are correspondingly set, and new comparisons are made of DA31 (211) to 73—80 on delay line 102. This is repeated until one or more of the comparisons indicates justification, i.e., the deficit accumulator is again reduced by the amount corresponding to the insertion of M plus N plus thin additional fixed space between words, then the process is repeated, trying first, expansion alone (for word up to 20 letters).

For simplicity, the preferred embodiment does not make provision for hyphenation of words that are longer than twenty letters, and it does not make provision for words that are hyphenated. It will be clear that the system may be modified to handle these cases if this is desired. For many purposes a hyphen in copy should be treated as a space band without expansion. Clearly a hyphen marks a hyphenation point, and usually it connects two words that have an independent identify for purposes of the justification routine.

Words longer than 15 letters present a different problem which is basically economic. The hyphenation memory might be expanded to any desired number of letters at increased cost, or a separate memory of smaller capacity might handle the longer words. An alternative solution to the long word problem is to cast a small bit of the burden back on the typist preparing the unjustified copy. He already has quite a bit of responsibility for directing the operation of the machine. To handle the longer words, the typist merely inserts the dollar sign $ at possible hyphenation points of the long word which are not more than about 15 letters apart, particularly he should place the dollar sign before words which are constituents of the longer word; thus;

Antidis$establishment$arianism

Since the dollar sign is a forbidden code in the middle of a word, the computer can readily recognize the meaning of the symbol and treat it as a space-band for purpose of initiating a justification routine. With help, as indicated, the computer would correctly hyphenate antidisestablishmentarianism at any syllable of the word.

It will be recognized that most long words are compound words and, therefore, the technique may be generally used to solve the problem. It will be clear that the setting of type for the German language and any other languages making frequent use of compound words will require this option.

COLUMN LENGTH SPECIFICATIONS

The column specifications allow a column to be set for so many lines at one width, then so many lines at another width, etc. Up to 99 lines may be set at any width or the machine may be directed by an R bit in the 16th, position of the width, which indicates the rest of the lines are to be set using the associated CWS. At the end of justifying each line in the manner above described, many events take place, one of these is to decrement the column length specification being used unless it has already reached R. This automatically provides for the proper selection of column width specification. When time comes to reload DA11 (or DA12) the column length specifications are read out in order through the comparator 207 to detect a zero, an r-bit, or a number in the register. If a zero, the machine compares the next column length specification, if a number, or an r-bit is present, the associated line-width specification is read out into register 201 and returned to the DA11 (or DA12) position.

COPY HANDLING SECTION

As indicated above, the flow of the copy through the machine is subject to control by the necessary operations involved in justifying the lines and in applying column length, width, and indentation instructions.

Copy flow is also influenced by the desirability of making the computer compatible with tape reading and tape punching machines which are already in common use in the industry.

The tape machines with which the computer is designed to operate transmit characters at the rate of 105 per second, each character comprising six holes punched in parallel across a paper tape.

For the purposes of the industry sufficient precision in the operation of these machines is obtained if they are synchronized with the power line frequency of 60 cycles per second, which on the average is controlled very precisely by the power company, but which may wander under varying load conditions more than can be accommodated by the ultrasonic delay lines 101 and 102 which are important components of the computer. It is considered preferable not to require synchronous operation of tape machines and computer, rather a small amount of slippage is built into the relationship between tape machines and computer so that correspondence is maintained by occasionally stopping a tape machine for one punch period.

One hundred and five characters per second is one character every 9.33 milliseconds. As indicated above, the five computation cycles requiring reference to the delay line are usually enough to secure justification of a line, 10 cycles to justify two lines. If two tape readers are associated with each computer, then characters will arrive about once every five milliseconds. A delay line access time of about one millisecond, therefore, provides five accesses for each character.

A delay line length of 1.024 milliseconds and a bit rate of two megacycles were, therefore, chosen as adequate for the machine. A higher bit rate, and shorter access time might be used if higher performance is desired.

At the selected machine rates, the tape reader runs just a little too fast to allow five delay line cycles for each character. This discrepency is corrected by stopping the tape reader for one character time whenever necessary. The input tape reader may also be stopped when a rare difficult hyphenation situation occurs requiring more than two trials for hyphenation.

FIG. 4 of three sheets is a block diagram of the circuits connected with delay line 101. Because of the two-channel operation of the system, as above only the operation of one channel (the upper channel), will be described. In addition to the tape reader interface 13 shown in FIG. 4b, there is a similar interface 13a for the second channel in FIG. 4a; there is an input character buffer 15 for the first tape reader 5, and a buffer 15a for the second.

Each character presented in parallel on six lines from the tape interface 13 is stored in the input buffer 15 and at the same time sent to the character decoding and program sequence recognition logic section 17. The buffer 15 is necessary to allow time for the decode logic 17 to determine whether the character is copy or instructions. If for example it is a dollar sign ($), it might be copy or instruction. In either case, it is passed to the parallel-to-serial converter 302 through the gate converter presets 303. If the dollar sign, which has been passed to the converter 302 is followed by a letter it is an instruction and in that case the dollar sign and the letter are not shifted out of the converter 302, and are lost as following characters are entered into the converter 302. If the dollar sign is followed by a numeral, or if other copy is involved, the character is shifted out of the converter 302 into the line 101 when the gate 305 is enabled.

For purposes of addressing the delay line 101, the counter 306 continuously counts at the rate of 250,000 counts per second, from zero to 256 and resets to zero. This counter may be considered as holding at any time the address of the portions of the line 101 into which, or from which, data may be flowing at any instant. The delay line is addressed by entering a number in matching network 307. Agreement between the number and the count of counter 306 indicates arrival of the designated address on the line.

Copy is entered on the line after the last previous character entered. The read present address counter 308 stores the position after the last one into which a character has been entered. To add copy, the content of the read present address counter 308 with the counter 306 is gated to the matching network 307. Upon a match, FF 311 opens the gate 304 and the data is shifted out serially through gate 305 into the delay line 101.

Other registers are used to store other significant addresses on the delay line 101 so that by comparison of these registers to the counter 306 access may be had to the addressed information. Register 314 termed the Start Punch Location Counter carries the address of the next character to be read out of the delay line 101 into the tape punch buffer 316. The start punch counter 314 is increased by one each time a character is read out of the line 101. Stop Punch location register 318 records the location of the last character of the last justified line. The last character register 320 is updated through buffer 321 with every space band entered on the line 101 and marks the point from which characters are copied out of the line 101 into the hyphenation section register 110 when hyphenation is called for. It is finally updated with the determination of a hyphenation point to mark the end of the line. The recycle-to-encoder counter 322 is of importance whenever a word is hyphenated. It marks the beginning of the terminal portion of the hyphenated word which is left on delay line 101 when the hyphenation process selects the first part of the word for punching out. At the beginning of the new line, characters are recycled to the width decoder and the total width accumulated is subtracted from the deficit accumulator before new copy is entered.

The matching network 324 provides for various comparisons between the just-enumerated registers for housekeeping functions within the copy storage section. Comparison of the Stop Punch Location Counter 318 with the Start Punch Location Counter 314 terminates the punching operation. Comparison of the Recycle-to-Encoder Counter 322 with the Read Present Address Counter 308 determines the recycle routine. When the specification and computation section satisfies the criteria for justification, several changes are made in the copy storage of the computer to prepare it to punch out a justified line. The amount of required fixed spacing, if any, is entered in the Fixed Spacing Insertion Logic 56. The content of the updated Last Character Counter 320 is transferred to the Stop Punch Location Register 318 and the same number is entered into the Recycle-to-Encoder Counter 322 and then increased by one. At the same time, the new line-width-specification is being transferred to DA11. As soon as it is transferred, the Recycle-to-Encoder routine commences the subtraction of character widths from it. Whenever the justification of a line calls for the transfer of the count from the Last Character Counter 320 to the Stop Punch Location Register 318 at a time when the content of register 318 is not the same as the content of the register 314, that is, if the previous line is still being punched out, then the input tape reader is stopped until the preceding line clears the delay line, freeing the Last Character Counter 320. Characters read out of the delay line 101 for output enter first the serial-to-parallel buffer 316 which ordinarily immediately presents the character in parallel output of six lines to control the tape perforator 105; however when a space band character is entered into buffer 316 for punching out it is recognized by space band detector 326 and activates the Fixed-Spacing-Insertion Control 330. This is a variable-sequencing circuit which inserts ahead of each space band the numbers of M, N, and Thin fixed spaces which have been calculated by the justification routine and have been set into registers 331—333 respectively for insertion upon the justification of each line as explained above. At each space band the counters 336—338 are set and decremented as the codes stored in gates 341—343 are successively gated to the punch 105 through the OR gate 350.

HYPHENATION

The hyphenation memory of this machine is designed to store the syllabification of words as contained in a standard abridged dictionary. There are approximately 300,000 words in such a dictionary. To store each of these words and its syllabification would require approximately 30 million bits of memory storage. Such a brute-force approach is, therefore, economically unfeasible. In order to avoid requiring such a large memory, the memory of this invention is caused to store only the hyphenation roots of words and to cause these roots to be scanned in a predetermined manner in order to hyphenate correctly any word from the list from which the memory root words were compiled. Only 35,000 root words need be stored in the hyphenation memory.

The memory is of the wire braid construction which is described in detail elsewhere in this specification. The words stored in the memory have been arranged in groups, each group containing hyphenation root words selected according to the criteria to be described. The number of groups to be used is within the control of the designer of the memory. Groupings are selected primarily to provide a design for the memory which minimizes the number of root words to be stored for a given list to be hyphenated. Each group has assigned to it a priority of search for hyphenation. A word is sought first in the root words of group I. If the word is not divisible from the search of group I, the processing proceeds to group II, of the root words in the memory. If not divisible in group II, the process continues in the same way in groups III and IV. If there has been no omission of words to be hyphenated when compiling the root words, hyphenation must occur in one of the four groups. If hyphenation does not occur because of an omission or because the word to be hyphenated was not in the list used in the compilation, hyphenation may be provided by using the 3-5-7 rule of hyphenation.

Division of the word Administrative illustrates how storage of root words yields significant economies in the number of words which must be stored. The prefix Administra is common to many words such as adminstrator, administrative, administrators, administration, administrated, etc. Each one of these words is hyphenated in exactly the same way, namely, ad-min-is-tra-, and therefore only the word, the root word, Ad-min-is-tra- need be stored in the hyphenation memory. Thus at the minimum, a five to one reduction is required memory capacity has been obtained by this approach. Since each of these words are different, an automated device for performing the hyphenation must have some basis for determining that the hyphenation for Administra is the correct hyphenation for all these words. It is also necessary for the computer to know that the hyphenation Ad-min-is-tra- is not the correct hyphenation for the word Administrate. The hyphenation memory of this invention is able to perform this differentiation in a unique and remarkably simple way.

Basically the hyphenation is accomplished by organizing the storage of root words in the memory such that a search through the memory is a prescribed way will be such that the correct root word for the word to be hyphenated will always be reached before a root word which will give an incorrect hyphenation. For example, assumed that the word to be hyphenated is Administrate. Assume also that along with thousands of other root words the root words Ad-min-is-tra- and Ad-min-is-trate have been stored in the hyphenate memory. The asterisk * indicates that the letter which appears in this position of the word to be hyphenated is immaterial to the correct hyphenation of the word. It is apparent that in searching through the memory it is necessary to examine the root word Ad-min-is-trate* before reaching the root word Ad-min-is-tra****** if a correct hyphenation of the word administrate is to be obtained.

ORGANIZATION OF HYPHENATION

As stated before, the primary object of priority grouping words for search is to minimize the needed number of root words for correct hyphenation of all the words of the working vocabulary. For words in common English usage it has been found that a practical minimization of storage capacity is obtained when the root words are classified into four groups, it being immaterial whether any word of a particular group is examined before or after any other word of the same group, but the examination of the groups being made in a prescribed order.

The rule by which groups are formed may be expressed as: "When a first root word starts with a second root word, the first word must be classified for search before the second."

The rule is exemplified by the following procedure which illustrates how a typical grouping of root words is obtained. In general the groups of root words is arranged so that the shortest hyphenation occurs in the group that is examined last. For example, there is a large group of words which begin with the syllables Un-, An-, Co-, Or-, etc. Since these root words introduce large blocks of other root words beginning with the same two letters of the alphabet, they are placed in group IV which is the last group to be examined in hyphenating a word.

Perhaps the organization of root words is best exemplified by taking a block of words as they appear in a dictionary and determine what the root words are for the chosen list of words. Selecting the proper size block is the first problem which confronts the person presented with the problem of grouping root words. There must be a block for every word in the dictionary. The size of a block for classification is a compromise between large blocks and an unwieldy number of words whose roots must be simultaneously considered and small blocks which somewhat increase the resulting total number of root words. The extreme of the latter is the case where each word in the dictionary is a block in which case every word would be stored as a root word. As a practical matter, a block of words is chosen to include those words which have common beginnings as for instance, the words beginning with Co-, Un-, etc.

Table III is a block of words beginning with Ap taken from a dictionary to illustrate in detail how root words are grouped to correctly hyphenate each word listed and to avoid hyphenating words not listed. Words not in this block, i.e., not beginning appe- form other blocks hyphenated in accordance with other groups of root words. Table IV illustrates the lists of root word groups derived following the rule established for forming groups starting with a group having the minimum hyphenation. The root words of Group IV correctly hyphenate those words of the list identified by the number IV. Appetency is listed as being correctly hyphenated as a group IV word even though it has another hyphenation following the N. This is so because the rule has been arbitrarily established that where a hyphenation is followed by only two letters that hyphenation will be ignored and considered that it does not exist.

It is demonstrated that a memory containing only the 19 grouped root words of Table IV will correctly hyphenate all the 44 words of the block of Table III from which the groups of root words were compiled.

That the words of Table III could be grouped into four groups is not mere happenstance. Any list of four or more words can be grouped into four groups. If five groups had been allowed, the root words of Group I would have been further divided:

Group I':
    ap-pen-di-          ap-pen-dee-
Group I'':
    ap-pen-di-ci-tis    ap-pen-dic-u-lar This would have resulted in requiring the storage of only 18 root words. However, in general, the saving in the number of root words to be stored is not worth the additional labor involved in grouping into more than four groups, and the increased complexity of the search mechanism.

TABLE III

| Group | Word | Group | Word |
|---|---|---|---|
| III | ap-pe-al. | II | ap-pend-ance. |
| II | ap-peal-a-bil-i-ty. | II | ap-pend-an-cy. |
| II | ap-peal-a-ble. | I | ap-pen-dec-to-my. |
| III | ap-peal-er. | II | ap-pend-ence. |
| III | ap-peal-ing-ly. | II | ap-pend-en-cy. |
| III | ap-peal-ing. | II | ap-pend-ent. |
| III | ap-pear. | I | ap-pen-di-ces. |
| III | ap-pear-ance. | I | ap-pen-di-ci-tis. |
| II | ap-pease. | I | ap-pen-di-cle. |
| III | ap-peas-a-ble. | I | ap-pen-dic-u-lar. |
| II | ap-pease-ment. | II | ap-pen-dix. |
| III | ap-pel. | III | ap-per-ceive. |
| III | ap-pel-lant. | II | ap-per-cep-tive. |
| III | ap-pel-late. | II | ap-per-cep-tion. |
| II | ap-pel-la-tion. | III | ap-per-tain. |
| II | ap-pel-la-tive. | IV | ap-pe-ten-cy. |
| III | ap-pel-lee. | IV | ap-pe-tence. |
| III | ap-pel-lor. | IV | ap-pe-tite. |
| II | ap-pend. | III | ap-pe-ti-tive. |
| II | ap-pend-age. | III | ap-pe-tiz-er. |
| II | ap-pend-ant. | III | ap-pe-tiz-ing. |
|  |  | III | ap-pe-tiz-ing-ly. |

TABLE IV

| Group IV | Group III | Group II | Group I |
|---|---|---|---|
| ap-pe-********** | ap-pen-********* | ap-pease-******* | ap-pen-di-ci-tis*** |
|  | ap-pel-********* |  |  |
|  | ap-pear-******** | ap-pel-la-****** | ap-pen-dic-u-lar*** |
|  | ap-peas-a-******* |  |  |
|  | ap-peal-******** | ap-pend-********* | ap-pen-dec****** |
|  | ap-per-********* |  |  |
|  | ap-pe-ti-tive***** | ap-per-cep-******* | ap-pen-di-cle***** |
|  | ap-pe-tiz-******** |  |  |
|  |  | ap-peal-a-******* | ap-pen-di-ces***** |

With the root word memory divided into four groups, it is interesting to observe how hyphenation of a word of Table III is determined. Take the word Appetency. The letters of appetency are first compared with the letters of the root words in Group I. The circuitry associated with the root word memory determines that the letters of significance in the words of Group I do not match those of appetency. Similarly for the words of Groups II and III. Therefore, no hyphenation is provided until the root word Ap-pe- of Group IV is reached since the letters Appe match the first four letters of appetency. The remainder of the letters of appetency do not match anything but the root word Ap-pe*********** indicates that no match is required in these character positions.

If a different word had been chosen for hyphenation, such as the word Appendage, the correct hyphenation would have been obtained by the matching obtained with the root word Ap-pend- of Group II. In this event, the search would stop and the correct hyphenation positions would be provided by the root word memory circuitry. It is apparent that it does not matter which root word of Group II is compared first with the word appendage since no match will be obtained until the root word Ap-pend- is reached which it must be at some time before the search proceeds to the Group III root words. It should be observed that if, through oversight, the root-word ap-pend- does not appear in Group II, the search process would continue into Group III where the word appendage would be incorrectly hyphenated as ap-pen-dage. Thus it is important to include in the list of words from which the root words are compiled. All those words which are anticipated to be used and therefore could be anticipated to be hyphenated. Where an error in hyphenation such as that illustrated above, is detected in the justified copy the error can be eliminated thereafter by the inclusion of the root-word Ap-pend- in any section of the memory containing Group II words. The core memory described below, while not erasible is designed to accept additions of root words, accommodate instances where words have been omitted or incorrectly root worded, or to handle new, technical, or local words.

Although the organization of the root word memory has been described for only one block of words from a dictionary, successive blocks are similarly processed until all the words of the source of words have been caused to be correctly hyphenable by some root word in the Groups I—IV. The root words in a certain group of one list are combined with the root words of the same group of a different list. Thus if Tea- is a Group IV root word of a list of words beginning with Tea, it would be searched as part of the same group containing the root word Ap-pe-.

HYPHENATION MEMORY

Information in the form of root words is stored in the memory. Each root word consists of a maximum of 15 letters of the alphabet with each letter allotted seven bits of storage. The first five bits identify the letter. These five bits are the first five of the six bits of the TTS code provided by the tape reader. For all letters of the alphabet the sixth bit of the TTS code is zero. The sixth bit in the seven bits of storage for each character is the Don't Care bit. The significance of the Don't Care bit will be given subsequently. The seventh bit is the hyphenation bit. A one stored in that position upon a match of the root word and the word to be hyphenated provides the output of the hyphenation memory showing a possible separation immediately following the character which contains a one in its seventh bit position.

Hyphenation is initiated by copying the word to be hyphenated into the hyphenation buffer register 110. The buffer parallel output is a five bit code for each character of the word so that each bit of the word to be hyphenated may be compared with the corresponding bit of the root word. When the corresponding bits are identical, the hyphenation memory circuitry provides an output signal indicating that the search of the memory for hyphenation should stop and also provides the positions in the word where the hyphenation is permissible.

Because of the unique construction of the memory in storing only root words instead of all the words to be hyphenated, not all the characters of the word to be hyphenated have to be matched with the root word characters. Which characters need not match is also determined by the persons who select the root words for the memory and the information is stored as Don't Care bits. More specifically, assume that the root word stored in the memory is Ap-pe-. When a word beginning with Appe is entered into the hyphenation buffer 110 and the search process causes a comparison of the characters of the word and root word, the memory indicates a match even though up to 16 remaining characters of the word to be hyphenated may be any letters of the alphabet or in fact no letters of the alphabet. This is accomplished by storing a One in the sixth bit of every character position of the root word from five through 15. The ONE in the sixth bit signifies that a Don't Care character exists at this position. Thus it is not necessary that the word to be hyphenated match the root word letter for letter.

The apparatus which provides the hyphenation information consists of a wire-braid memory together with associated cores and energization and logic circuitry. The braid memory stores the root words. Seven bits of capacity is provided to store each letter of five bits to identify each letter of the word together with a Don't Care and hyphenate bit. Since the storage for each letter or other character is the same as for every other character in a word, the detailed circuitry for only one character is shown.

The circuit for storage of one character of a root word together with the circuitry for comparison of the character with that of a word to be hyphenated is shown in FIG. 5. Each of the seven bits of a character relates to one of the magnetic cores 401—407. A wire 408 either goes through or around a bit core depending upon whether a one or a zero respectively is to be stored in that bit position. With core 401 in the first bit position, the wiring configuration of FIG. 5 is storing the character bits 10100, the Don't Care bit is a ZERO, and the hyphenation bit is a one. A ONE in the Don't Care bit signifies that it does not matter if the associated character in the root word does not match that of the word to be hyphenated. The ONE in the hyphenation bit position indicated that a hyphenation occurs after the associated character if the words match.

Each of the five cores of the character bits is also threaded with a winding 411—415 connected to a cancel driver 421—425 each of which is in turn connected to one of the five flip-flops 431—435 which represents the bit information in the corresponding character of the word to be hyphenated. If the first bit stored in the register 110 is a ONE, the state of flip-flop 431 will be such that cancel driver 421 produces a pulse of current in winding 411 which will be in opposition to the magnetizing force of the pulse of current produced in wire 408, as it is simultaneously pulsed from a source 431. The two opposing current pulses in windings 408 and 411 cancel each other with the result that the output winding 441 has only a small residual output voltage compared to the voltage induced in it when only one of the windings 408 or 411 is energized. Therefore the first bit of the character of a root word is determined to be matched to the corresponding bit of the corresponding character of the word to be hyphenated when no output voltage is sensed on the output winding 441.

The storage of a ZERO in the root word as in the bit represented by core 402 is accomplished by causing wire 408 to pass around rather than through core 402. If there is a zero in the corresponding bit of the character of the word to be hyphenated, flip-flop 432 state will be opposite to that which it has when there is a ONE in the bit. The state will be such that the cancel driver 422 does not provide a current pulse in winding 412. Since there is no magnetism force applied to the core 402 at the bit position under consideration, there will be no output voltage induced in the output winding 442 thereby indicating a match in bit position corresponding to core 402.

Each of the five bits of each of the characters in the root words and the word to be hyphenated are similarly compared for a match. The circuit 450 of FIG. 5a shows how this comparison is made. The output or Sense windings 441—445 from the core bits of a character are applied as inputs to NOR circuit 451. If any one sense windings 441—445 has a signal on it as would be produced from a mismatch of bit information, the output 453 of the NOR circuit 451 is in a low state. If there is a match condition, the sense lines 441—445 are each in a low state. The clock input 455 normally is high and gates the output 453 of the NOR circuit 451 by causing its output 453 to always be in the low state except during the clock pulse, a low state, when the output 453 of NOR circuit 451 is determined by the state of its other inputs 441—445.

The output 453 of NOR circuit 451 and the clock pulse 455 are applied as inputs to a second NOR circuit 457 together with the output signal on sense winding 446 on the Don't Care bit core 406 of FIG. 5. The Don't Care bit core 406 does not have a cancel circuit associated with it. When the root word wire 408 goes through the core of the Don't Care bit (a ONE in binary representation) a current pulse causes an output signal on sense winding 446. This output signal on line 446 when applied as an input to NOR circuit 457 holds its output 459 low regardless of the state of the output of NOR circuit 451. In other words, a low output indicating a match condition will be obtained from the character match circuit of FIG. 5a regardless of whether the character of the word to be hyphenated matches the character of the root word, if there is a signal on the Don't Care line 446.

The character-match circuit 450 is used for each of the up to 15 characters of the root word and of the hyphenation word. The output 459 of each character match circuit 450 is shown in FIG. 6 to be provided as inputs to OR circuit 501 whose output 503 will be in the low state if there is a match on all the 15 characters of the words. The combination of the character match circuits 450 and the gate 501 to provide indication of the match of a word comprise the Memory Comparison Circuit (MCC) 510.

Thus far the description of the hyphenation memory operation has been limited to a description of its construction and operation as applied to one word. However, since the entire memory of 32,000 words is to be scanned in no more than two milliseconds, and because of limitations on the speed of the circuits employed, it is necessary to process a number of words at the same time. In the particular apparatus under consideration, sixteen root words are compared simultaneously to find the matching root word and to determine its hyphenation points. Thus a memory comparison circuit 510 is provided for each of the sixteen root words. Their outputs 503 are provided as inputs to the 16 input OR circuit 512 which has a low output state if a match exists on any of the sixteen root words. A low state on the output 514 of OR circuit 512 causes the memory control circuit 516 of FIG. 7 to stop the search of the root words in the hyphenation memory.

Assuming that the word comparison circuitry 510 has indicated that a word match has been obtained and the root word search has therefore stopped, there still remains the problem of determining where in the root word the hyphenations are to occur. Each character has a hyphenation bit core on which there is a sense winding 447. Just as with the Don't Care bit, if the root word wire 408 goes through the core in the hyphenation bit position, it will produce an output signal on winding 447 which is interpreted as meaning that the root word is hyphenable after the character with which it is combined. Thus for the circuit for the character depicted in FIG. 5 a hyphen would be proper after the character stored in the first five cores 401—405 since wire 408 goes through the core 407 in the hyphenation bit position.

The winding 447 on the hyphenation core is present on the core whether or not wire 408 threads the core. Each winding 447 from each character of a word is provided as a separate input to the hyphenate enabler circuit 520 of FIG. 6a. The hyphenate enabler circuit is seen to consist of 15 identical circuits each comprising a transistor emitter follower 521 with base connected to one of the hyphen-sense windings 447 and also to a clamping diode 523. Since there are 16 words being energized simultaneously, each with 15 hyphen sense windings there are a total of 240 clamped emitter followers. The clamping signal applied to the common terminal 525 of the diodes 523 is obtained from the output 503 of the word comparison circuit(WCC) 510. The output 503 which is low when there is a word match is inverted by inverting amplifier 530 to provide a high state on match at terminal 525. This high state at terminal 525 enables each of the clamped emitter followers 521 of FIG. 5 to provide a high output signal at its output terminal 532 if a signal appears on its winding 447 at that time. Only those outputs 532 will go high whose inputs are connected to hyphenation bits having stored therein, and which are part of the root word which has been matched.

Since there are 16 sets of hyphenation enablers 520 and only one can be providing information at any time, corresponding bit outputs 532 are combined in an OR gate 610 before being applied as an input to set the flip-flop in the hyphenation information register 611 corresponding to the hyphenation bit of the corresponding character of the selected root word. Bit outputs 532 from all the enablers 520 are applied as inputs to a second OR gate 610' whose output activates a second flip-flop in the register 611 corresponding to the second hyphenate bit of the selected enabler bit circuit 520 and so on for the remaining 13 bits of the root words. Thus the hyphenation information flip-flop register 611 stores in its 15 individual bit flip-flops the hyphenation information of the root word which is matched with the word to be hyphenated in the 100 bit buffer 110.

The wire braid word memory has been described above referring to FIG. 5 for one letter of a root word. Successive letters of the root word are provided for by additional groups of cores threaded by the line 408, with the line 408 either going through the cores or not depending on the character being represented and the information to be stored in the Don't Care and hyphenation bits. Thus a root word of 15 characters is stored in a group of 105 cores. Many other root words may be stored using the same cores as used by line 408. *All* that is necessary is to provide separate lines 408 for each different root word. Of course, each line 408 will thread cores 401—407 etc. in a different sequence from any other line since different information is contained on each line.

As discussed previously it is found desirable to energize 16 root words simultaneously for their simultaneous comparison with the word to be hyphenated. In order to do this, the current source 436 of FIG. 5 by which line 408 is energized comprises a matrix selection scheme such as that commonly employed in conventional memory-switching systems.

When hyphenation is determined by the computation section to be required and the word to be hyphenated is placed in the hyphenation buffer register 110, a signal is provided to the memory control circuit 516 to start the search process. This is done by causing the circuit 516 to place a ONE in the first position of each of two shift registers, 630, 640. The clock signal of one megacycle is applied to the 40 stage shift register 630 and causes the register to shift the ONE through the register at this frequency. Each stage of each register is connected to a current driver, the register 630 stages being connected to drivers 701—740 of FIGS. 7 and 8 while register 640 is connected to drivers 741—790. The current drivers 701—790 are arranged such that only those drivers which are connected to the stage in the ONE state will be energized. The shift register 630 is arranged to cause the output of the last or 40th stage to put the ONE back in to the first stage and also to cause the 50 stage shift register 44 to advance one stage. Since each stage is connected to a current driver as shown in FIG. 8 every current driver 741—790 will be connected to every current driver 701—740 through diodes 791, as the shift registers 43, 44 are shifted through their stages. Each diode 791 is serially connected with 4 lines 793—796, each of which performs the same function as winding 408 of FIG. 5. Each of the lines 793—796 provides the energization for four root words. Thus for each energized stage of shift registers 630—640, only one group of four lines 793—796 lines will be energized at a time and this energization provides simultaneous checking for match of 16 root words with the word to be hyphenated. Since registers 630—640 are 40 and 50 stage registers, 2,000, fourline groups are selectively energized thereby allowing a search of 32,000 root words.

The current drivers 701—790 provide one ampere of current (250 ma/line through a core). The drivers 701—790 are simply current amplifiers which may be gated on or off by the state of their corresponding shift register stage. Since the 40 stage shift register 630 shifts at a one megacycle rate, these current pulses are approximately one half microsecond in duration. Since there are 2,000 lines to be scanned, the search of the entire memory takes two milliseconds. The number of cores 401—408 used in the memory is determined by the number of lines 793—796 which thread a common set of cores. In the machine herein described there are a total of 8,000 lines (2,000×4). Up to 288 lines thread common cores to provide a Rope or braid of 288 wires. Therefore, 28 braids (some with less than the full 288 wires) make up the memory with each braid linking 105 cores (7×15) for each word or a total of 420 meshes where four words are serially energized.

At this point in the description of the apparatus used to determine where the end-of-line word is to be hyphenated, it may be considered that the hyphenation memory proper has completed its function by providing the hyphenation points at which the end-of-line word may be hyphenated. It is now necessary to consider how the information in the hyphenation information flip-flop register 611 is to be utilized.

Once the information as to hyphenation points is available in hyphenation information register 611, subsequent operations are confined to register 611, a 15 bit shift register 612, and the And gates 613 between the registers. On the occurrence of a match, the hyphenation control circuit 113 causes a ONE to be placed in the first bit position of the 15-bit shift register 612. This ONE is shifted down the register 612 by pulses from the control 113 at a *relatively slow rate* of 15.625 per second. The output of each bit of register 612 is applied to an AND gate 613 which has an additional input from the corresponding bit of the 15 - bit hyphenation information register 611. The first of the bit outputs of register 611 is labeled 15-—16 which indicates that the hyphenation, if it exists at all, is after the 15th character, the next 14—15 after the 14th character similarly for 13—14, etc. The ONE in register 612 is compared first with the 15—16 position of register 611. If a ONE occurs at both inputs of the corresponding AND gate 613, this indicates that a hyphenation exists at the end of the root word. This is the hyphenation point which provides the longest hyphenation of the word to be hyphenated and the search always proceeds in obtaining hyphenation points beginning with the end of the word, 15 letters, if longer.

Whenever a hyphenation point is found, as evidenced by an output of the corresponding AND circuit 613, it provides an input to the 15-input OR circuit 616 which in turn provides a signal to the hyphenation control circuit 113. The output of each AND circuit 613 also resets to ZERO the hyphenation flip-flop to which it is connected when the AND circuit has an output. However, the hyphenation information at that bit position is not lost because it is effectively retained in the ONE position of the register 612 in the following way. At the time a hyphenation point is detected, the hyphenation control circuit 113 provides an output on line 617 which starts the shifting out of characters from the 100-bit hyphenation buffer 110 which contains the word to be hyphenated. These characters are shifted out at the relatively slow rate of 15.625 per second because the width of each character must be accumulated by the computation and specification section including registers 211 or 211a. At the same time, the register 612 is being shifted at the same rate from the bit position at which a hyphen occurred to the end of the register 612. When the ONE in register 612 has been shifted out of the last stage of register 612, a control signal on line 619 is provided which stops the shifting out of characters from buffer 110. At that time the justification logic section 24 may determine whether the line is justifiable at that hyphenation point. If it is justifiable, then all the information in the hyphenation memory registers 110, 611, 612, 630, 640 is reset to ZERO until the need for hyphenation occurs again.

If the line is not justifiable with the maximum word length obtained at the first hyphenation point, a signal is provided by the justification logic 24 to the hyphenation control circuit 113 to once again shift the ONE in the first bit of register 612 down the register to find the next hyphenation point. At each trial only that one hyphenation flip-flop in register 612 which enables the AND gate 613 which provides an output is reset, the remainder of the AND gates 613 being disabled while register 612 is shifted in order to avoid resetting the other hyphenation points of register 611 to ZERO. The renewal of the process automatically selects the next longest hyphenation position; and the justification calculations are repeated as before until justification is attained.

MEMORY BRAID

As explained above much of the effectiveness of the computer of the invention depends upon its electrically-accessed multi-megabit memory containing syllabification for substantially all of the English words in common usage. To be practical, the cost per bit of storage must be well under a penny a bit. The transformer core memory, wherein hundreds of bits are stored in a strand of ordinary copper magnet wire, which shares with many other such strands a string of transformer cores, is a memory for which the cost of materials is very low as will be explained below. The ultimate cost of fabricating these materials into a working memory is also very low because tedious hand work is almost completely eliminated. As explained above, a wire threading a core represents a ONE, a wire by passing a core, a ZERO. In some magnetic core memories the pattern of wires which defines the memory is individually bit-by-bit and core-by-core embroidered by women using needle and wire. While it would be possible to fabricate the memory described herein by such a process or manner, a much simpler way will be described.

Since the cores need not be, indeed, preferably are not, of the square-hysteresis-loop variety, the magnetic circuits may be interrupted by the small air gaps inherent in two-piece construction. Accordingly C-I ferrite cores are used in the memory. The wire is formed first, then applied to a string of open C cores. Their magnetic circuits are closed by adding the I's. Instead of doing this for just one wire at a time it can be done for several or many at once and can be automated. A loom for this purpose has been built as shown in FIG. 9. In this model, up to 288 wires such as wire 810 are braided at a time, one bit, or core position, at a time. To do the actual weaving the wires have to be spearated, those to go through a particular core in one group, those to go around it into another group.

The loom comprises a base plate 812, through which are drilled 288 holes 814, at each hole a solenoid is mounted of which two, 816, 818 are illustrated. Situated above the base plate is an elevator plate 820 having 288 superimposed holes 822, aligned in pairs with the 288 holes 814 of the base plate 810. Each pair guides a heddle 824. Each heddle has a head 826 at its upper end and a central eye 830. A heddle may be supported in an up position by one of the plungers 832, 834 of the solenoids 818, 816 and in the down position when the head 826 rests on the elevator plate 820. From 288 spools, of which two 836 and 838 are illustrated, wires pass one through each of the eyes 830 and are gathered at the foot of the loom 840. Wires passing through the eyes of heddles in the up position from a group of ZERO's while wires passing through eyes in the down position form a group of ONE's as will be further explained below. At the beginning of each cycle of the machine, the elevator plate 820 is carried upward by a mechanism not shown, raising all rods to the up position where they are latched by the solenoid plungers 832, 834. The elevator plate 820 is then lowered so that any heddle 824 may be dropped by the activation of its supporting solenoid.

Instead of a shuttle carrying a skein of woof thread between the sets of wires at each step, the wires are temporarily separated by metal spacers 844 shown to greatly exaggerated scale. The spacers are typically rods only a one quarter inch square and about four inches long with grooves 846 on opposing sides for the passage of ties. In contrast, the heddles typically drop several inches. While the width of loom required for 288 wires is necessarily of the order of two feet the wires are bundled together to form a flat braid 848 substantially less in width than in height as it is formed. In the braid as formed each core position mesh is bounded by four legs. A ZERO leg, 850; a ONE leg 851, and two transition legs 852 and 853. As the loom progresses from bit position to bit position the number of wires in any one of these legs varies generally in a substantially random manner from a minimum of one to a maximum of 288; however, since it will be recognized that a don't care bit will seldom occur at the first letter in a word but frequently in the position of the 15th letter there will be many meshes where the ZERO leg or the ONE leg is substantially lacking in representation. Accordingly to give the braid a physical continuity in such cases three strips 861, 862 and 863 of Teflon spaghetti are braided with the wires. The first 861 of these strips extends along the ZERO legs of the meshes, the second 862 extends along the ONE legs, while the third 863 spirals, up with one transition leg, and down with the next, etc. As each loop of the braid is formed, the wires and the teflon spaghetti are securely bundled together with twine and tied at each of the four corners of each mesh.

As explained above, the memory is organized and addressed on a wire-by-wire basis; yet it is manufactured on a core-by-core basis. Recourse is had to a general purpose computer to reformat the word lists typed in the first instance on Flexowriter tape one word after another into punched paper tape, of the kind above described, containing the core-by-core directions for use in controlling the dropping of rods in the loom. It is necessary to enter and store in the general purpose computer the 105 bits of syllabification information for each of 288 words so that this information read in, a word at a time, may be read out a core at a time.

The control of the loom by this paper tape is explained in connection with FIG. 10. The tape reader clock 932, controls the timing necessary for operation of the loom. A photoelectric tape reader 901 is used to translate the tape into electrical control signals. Four of the channels of the tape are information channels presenting impulses on the lines 911—914. A hole signifies a rod is to drop, otherwise it is up. There is a fifth channel for use in advancing the selector switches 921 and 922. The selector 921 designated the Y-selector is a 24-position telephone-type selector switch. The selector 922, designated the X-selector is a four-pole 3-position telephone-type selector switch. A signal on the fifth output line 925 of the tape-reader 901 triggers the advance driver 926 which increments x-selector by one step. The end of the 72 such advances required for the selection of the 288 rods is marked by a bit punched in the sixth tape channel, the output 928 from which to a control 930 interrupts the tape reader 901 to stop the machine while the operator collects and ties the wires into a mesh. For convenience, a seventh hole position is used to produce a signal to turn on the motor 832 which elevates the plate 820 at the beginning of the next cycle.

As illustrated by FIG. 11, a matrix selection scheme is used to select any one of the heddles 824. The 288 dropping solenoids are electrically ordered for selection into a matrix having 24 columns and 12 rows. It will be understood that these rows and columns need have no relationship to the physical placement of relays on the base plate 812. Each of these relays has a first terminal and a second terminal. The first terminals of each relay in a row are connected each to the others by one of 12 row busses 941—952. Each of the second terminals of a column of solenoids is connected through a decoupling diode 955 to one of 24 column busses 961—984. The wiper of the 24 position Y-selector switch 921 is wired to the positive side of the solenoid power supply 985. Each of its 24 positions is wired to a corresponding one of the column busses. The 12 contact positions of the X-selector 922 are wired each to one of the row busses. Each of four electrically independent wipers of selector 922 is wired through normally-open contacts of the relays 991—994 to the negative terminal of the power supply 984. The relays 991 through 994 are energized via the four information channel output lines 911—914 of the tape reader 901. With this arrangement the 288 solenoids are scanned in 72 steps. At each step up to four heddles may be dropped as determined by the hole pattern.

These paragraphs are added to further explain the operation of the computer 10 after an end-of-line separation has been decided upon. The hyphenation address is set into the stop punch location register 318 which directs a read out up to that point on delay line 101 and the flip-flop is set in the add hyphen logic 352 associated with output buffer section 35. This logic causes the code for hyphen to go from the hyphen code network 353 to OR gate 350 when circuit 324 shows a match of start punch register 314 and stop punch register 318 to indicate end of line.

The terminal portion, or tag end of the hyphenated word must be set at the beginning of the next line. Instead of arranging the computer to keep track of the length of the tag end it is recycled through a serial to parallel buffer 120 and the merger 112 to the character decoders and sequence detector 17. The character widths are transmitted to the data processor comprising calculation logic 24, the memory address and control 114 and delay line 102.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. The process for formatting a block of binary data into a memory braid wherein the stored bits for addressing each word and the data associated with each word are stored in the pattern of a single wire, and returned from sense windings on linking cores when said wire is pulsed, comprising the steps of:
   a. encoding said block, word-after-word onto a first storage medium;
   b. entering said block of data from said medium into a computer memory in matrix form wherein successive words occupy columns and successive bits of said words define rows;
   c. reading out from said computer memory, row by row, into a data tape; and
   d. controlling by said data tape the dropping of heddles in a loom threaded by wires, tying said wires into meshes as each row is encoded into the pattern of a mesh.

2. A loom for preparing memory braids comprising:
   a. a tape reader;
   b. a first selector switch;
   c. a second selector switch;
   d. an advance driver controlled by said tape reader to advance said second selector;
   e. a base plate, horizontally extending and having a purality of guide holes vertically piercing it;
   f. an elevator plate;
   g. means for supporting said elevator plate above said base plate in parallel-spaced-apart relationship, said elevator plate being pierced by an equal plurality of guide holes vertically aligned with said first-named holes;
   h. an equal plurality of heddles each having a head and a central eye and proportioned to slide in said guide holes and to rest with head against the upper hole;
   i. an equal plurality of solenoids attached to the bottom of said base plate with plungers intercepting said base plate guide holes;
   j. means to elevate said elevator plate and with it all heddles above said plungers whereby said heddles are supported by said plungers;
   k. connections between said relays and said selectors, whereby under the control of a tape any one of said plungers may be pulled to drop any heddle; and
   l. means connected to said tape reader to control the dropping of heddles in accord with a pattern of holes in the tape.

3. Apparatus for formatting a block of binary data into a memory braid wherein the stored bits for addressing each word and the data associated with each word are stored in the pattern of a single wire, and returned from sense windings on linking cores when said wire is pulsed, comprising:
   a. means for encoding said block, word-after-word onto a first storage medium;
   b. means for entering said block from said medium into a computer memory in matrix form wherein successive words occupy columns and successive bits of said words define rows;
   c. means for reading out from said computer memory, row by row, into a data tape;
   d. means responsive to said data tape for controlling the dropping of heddles in a loom threaded by wires; and
   e. means for tying said wires into meshes as each row is encoded into the pattern of a mesh.

4. Apparatus as claimed in claim 3 further comprising a loom and in which said loom and said means for controlling include:
   a. a tape reader;
   b. a first selector switch;
   c. a second selector switch;
   d. an advance driver controlled by said tape reader to advance said second selector;
   e. a base plate, horizontally extending and having a plurality of guide holes vertically piercing it;
   f. an elevator plate;
   g. means for supporting said elevator plate above said base plate in parallel-spaced-apart relationship, said elevator plate being pierced by an equal plurality of guide holes vertically alligned with said first-named holes;
   h. an equal plurality of heddles each having a head and a central eye and proportioned to slide in said guide holes and to rest with head against the upper hole;
   i. an equal plurality of solenoids attached to the bottom of said base plate with plungers intercepting said base plate guide holes;
   j. means to elevate said elevator plate and with it all heddles above said plungers whereby said heddles are supported by said plungers;
   k. connections between said relays and said selectors, whereby under the control of a tape any one of said plungers may be pulled to drop any heddle; and
   l. means connected to said tape reader to control the dropping of heddles in accord with a pattern of holes in the tape.

5. A process of forming a block of binary data into a memory braid including a first plurality of wires braided on a second plurality of cores and having in the pattern of each single wire stored bits for addressing each word and data associated with each word and having sensing windings on said cores for sensing said data when a wire is pulsed, said process comprising:
   a. encoding said block of data, word-after-word, onto a first storage medium;
   b. entering said block of data from said storage medium into a computer memory in matrix form wherein successive words occupy columns and successive bits of said words define rows;
   c. reading out from said computer memory, row by row, into a data tape;
   d. controlling by said data tape the positioning of elements, each element having associated therewith a unique wire, to place said wire in one of two preselected positions, whereby in at least one of said two preselected positions a group of wires is formed as a result of the positioning of said elements; and
   e. inserting spacing means to permanently retain said wires in groups.

6. Apparatus for forming a block of binary data into a memory braid including a first plurality of wires braided on a second plurality of cores and having in the pattern of each single wire stored bits for addressing each word and data associated with each word and having sensing windings on said cores for sensing said data when a wire is pulsed, said apparatus comprising:
   a. means for encoding said block of data, word-after-word, onto a first storage medium;
   b. means for entering said block of data from said storage medium into a computer memory in matrix form wherein successive words occupy columns and successive bits of said words define rows;
   c. means for reading out from said computer memory, row by row, into a data tape;

d. means for controlling by said data tape the positioning of elements, each element having associated therewith a unique wire, to place said wire in one of two preselected positions, whereby in at least one of said two preselected positions a group of wires is formed as a result of the positioning of said elements; and e. means for inserting spacing means to permanently retain said wires in groups.